(12) United States Patent  
Morifuji et al.

(10) Patent No.: US 8,520,963 B2  
(45) Date of Patent: Aug. 27, 2013

(54) IMAGE PROCESSING APPARATUS, IMAGE PROCESSING METHOD, AND PROGRAM FOR PROCESSING CONTENT BASED ON USER VIEWING SITUATION

(75) Inventors: Takafumi Morifuji, Tokyo (JP); Suguru Ushiki, Tokyo (JP)

(73) Assignee: Sony Corporation, Tokyo (JP)

( * ) Notice: Subject to any disclaimer, the term of this patent is extended or adjusted under 35 U.S.C. 154(b) by 321 days.

(21) Appl. No.: 12/965,206

(22) Filed: Dec. 10, 2010

(65) Prior Publication Data

US 2011/0182498 A1 Jul. 28, 2011

(30) Foreign Application Priority Data

Jan. 25, 2010 (JP) ................ P2010-013132

(51) Int. Cl.
*G06K 9/36* (2006.01)
*G06K 9/46* (2006.01)

(52) U.S. Cl.
USPC .......................................... 382/239; 382/232

(58) Field of Classification Search
USPC ................................................ 382/232–254
See application file for complete search history.

(56) References Cited

U.S. PATENT DOCUMENTS

| 5,701,383 | A * | 12/1997 | Russo et al. | 386/298 |
| 5,751,345 | A * | 5/1998 | Dozier et al. | 348/153 |
| 2003/0235394 | A1 * | 12/2003 | Boston et al. | 386/46 |
| 2005/0163481 | A1 * | 7/2005 | Hirai | 386/69 |
| 2008/0101182 | A1 * | 5/2008 | Chikaoka et al. | 369/47.14 |
| 2010/0329648 | A1 * | 12/2010 | Tadmor et al. | 386/343 |

FOREIGN PATENT DOCUMENTS

JP 2008-83073 4/2008

* cited by examiner

*Primary Examiner* — Li Liu
(74) *Attorney, Agent, or Firm* — Finnegan, Henderson, Farabow, Garrett & Dunner, L.L.P.

(57) ABSTRACT

An image processing apparatus includes a viewing situation analyzing unit configured to obtain information representing a user's viewing situation of 3D content stored in a certain storage unit, and, based on a preset saving reference in accordance with a viewing situation of 3D content, determine a data reduction level of content data of the 3D content stored in the storage unit; and a data conversion unit configured to perform data compression of the content data of the 3D content stored in the storage unit in accordance with the determined data reduction level.

10 Claims, 16 Drawing Sheets

FIG. 3

| NUMBER OF VIEWING TIMES | ELAPSED TIME | |
|---|---|---|
| | SHORT | LONG |
| SMALL | "LOW" DATA REDUCING LEVEL | "HIGH" DATA REDUCING LEVEL |
| GREAT | NO DATA REDUCTION | "LOW" DATA REDUCING LEVEL |

FIG. 6

|  | ORIGINAL DATA | "LOW" DATA REDUCING LEVEL | "HIGH" DATA REDUCING LEVEL |
|---|---|---|---|
| BIT RATE CONVERSION | 8 Mbps | 5 Mbps | 3 Mbps |
| RESOLUTION CONVERSION | 1920 × 1080p | 1280 × 720p | 720 × 480p |
| FORMAT CONVERSION | Full HD × 2 | Full HD + Depth | Full HD × 1 |
| PARALLAX CONTROL |  | REDUCE PARALLAX | 2D |

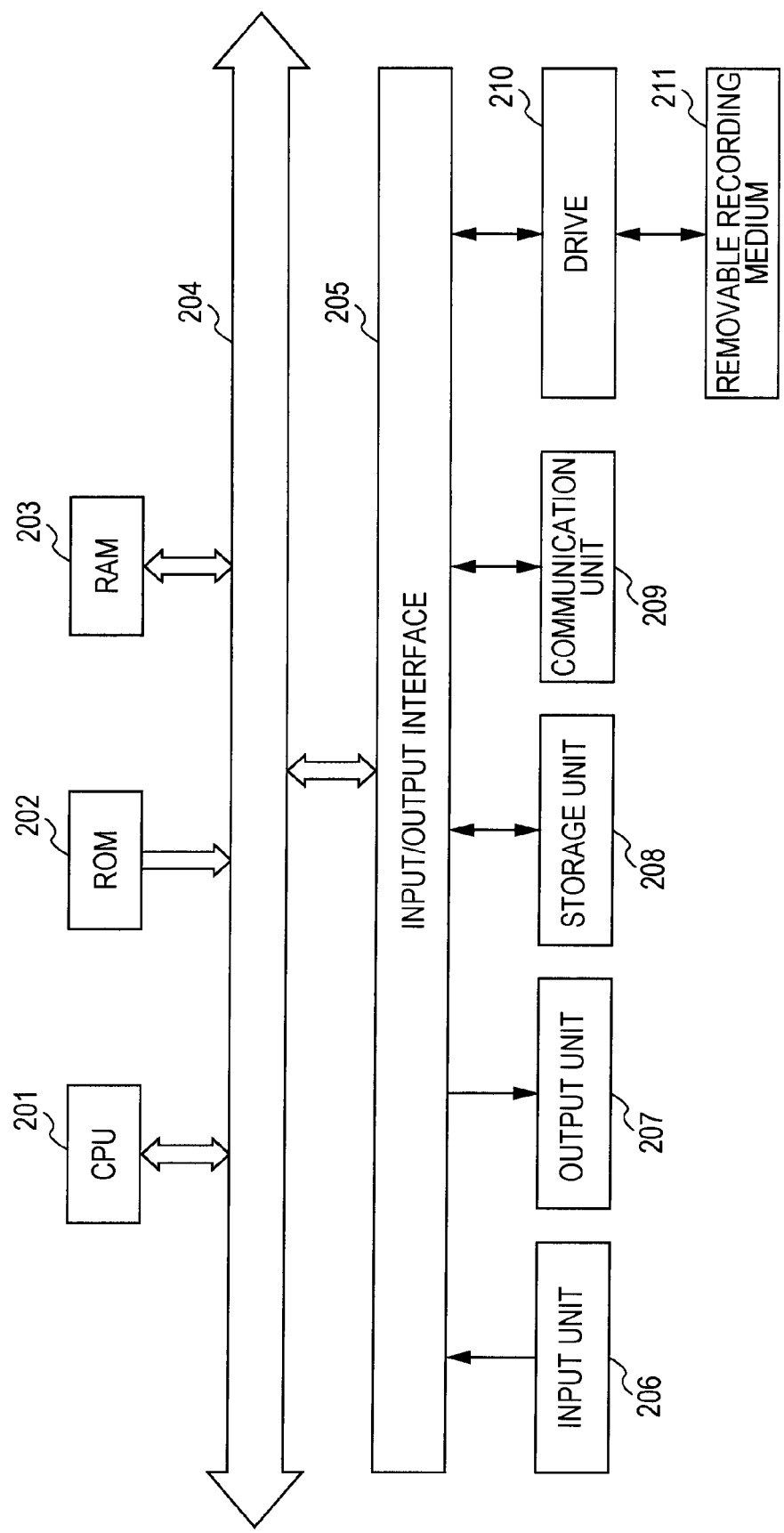

IMAGE PROCESSING APPARATUS, IMAGE PROCESSING METHOD, AND PROGRAM FOR PROCESSING CONTENT BASED ON USER VIEWING SITUATION

BACKGROUND OF THE INVENTION

1. Field of the Invention

The present invention relates to an image processing apparatus, an image processing method, and a program, and more particularly to an image processing apparatus, an image processing method, and a program that enable saving of content in accordance with a user's viewing situation.

2. Description of the Related Art

In recent years, attention has been paid to three-dimensional stereoscopic image content (hereinafter referred to as "3D content") that enables stereoscopic viewing of images, and many 3D content display techniques have also been proposed. For example, in Japanese Unexamined Patent Application Publication 2008-0083073, a stereoscopic display apparatus that improves image quality by suppressing crosstalk of multi-view images is proposed.

As a three-dimensional stereoscopic image appreciation method, a binocular parallax method of allowing an appreciator to appreciate an image for the left eye (hereinafter referred to as an "L image") and an image for the right eye (hereinafter referred to as an "R image") that have parallax has been spreading.

An L image and an R image are independently viewed and recognized by the left eye and the right eye, respectively, when an appreciator wears, for example, shutter glasses with a shutter function of alternately opening/closing the left and right glasses. Alternatively, as a method that does not involve an appreciator to wear glasses, for example, there is a method of separating light paths of an L image and an R image by arranging semilunar small lenses (lenticular lens), and allowing the left eye and the right eye to independently view and recognize the L image and the R image, respectively.

SUMMARY OF THE INVENTION

As described above, since 3D content involves an L image and an R image, the amount of data is greater than existing two-dimensional image content (hereinafter referred to as "2D content").

Hitherto, in recording/reproducing apparatuses such as hard disk drive (HDD) recorders, users themselves organize content that have been recorded by the users, such as by performing deletion of content that the users do not wish to view or data compression of content. Since 3D content has a greater amount of data than 2D content, as has been described above, it is expected that the number of times it is necessary to organize content increases in recording/reproducing apparatuses and the like. Therefore, a content saving method that does not bother a user is desirable.

The present invention enables saving of content in accordance with a user's viewing situation.

An image processing apparatus according to an embodiment of the present invention includes the following elements: viewing situation analyzing means for obtaining information representing a user's viewing situation of 3D content stored in certain storage means, and, based on a preset saving reference in accordance with a viewing situation of 3D content, determining a data reduction level of content data of the 3D content stored in the storage means; and data conversion means for performing data compression of the content data of the 3D content stored in the storage means in accordance with the determined data reduction level.

An image processing method according to an embodiment of the present invention is such that an image processing apparatus that processes image data obtains information representing a user's viewing situation of 3D content stored in certain storage means, and, based on a preset saving reference in accordance with a viewing situation of 3D content, determines a data reduction level of content data of the 3D content stored in the storage means; and the image processing apparatus performs data compression of the content data of the 3D content stored in the storage means in accordance with the determined data reduction level.

A program according to an embodiment of the present invention causes a computer to function as: viewing situation analyzing means for obtaining information representing a user's viewing situation of 3D content stored in certain storage means, and, based on a preset saving reference in accordance with a viewing situation of 3D content, determining a data reduction level of content data of the 3D content stored in the storage means; and data conversion means for performing data compression of the content data of the 3D content stored in the storage means in accordance with the determined data reduction level.

According to an embodiment of the present invention, information representing a user's viewing situation of 3D content stored in certain storage means is obtained, and, based on a preset saving reference in accordance with a viewing situation of 3D content, a data reduction level of content data of the 3D content stored in the storage means is determined. In accordance with the determined data reduction level, data compression of the content data of the 3D content stored in the storage means is performed.

The image processing apparatus may be an independent apparatus or may be an internal block included in a single apparatus.

According to an embodiment of the present invention, content can be saved in accordance with a user's viewing situation.

BRIEF DESCRIPTION OF THE DRAWINGS

FIG. 3 is a diagram describing a data reduction level determining method;

FIG. 6 is a diagram summarizing data conversion in accordance with data reduction levels;

FIG. 16 is a block diagram illustrating an example of the configuration of a computer according to an embodiment of the present invention.

DESCRIPTION OF THE PREFERRED EMBODIMENTS

Figure 1:
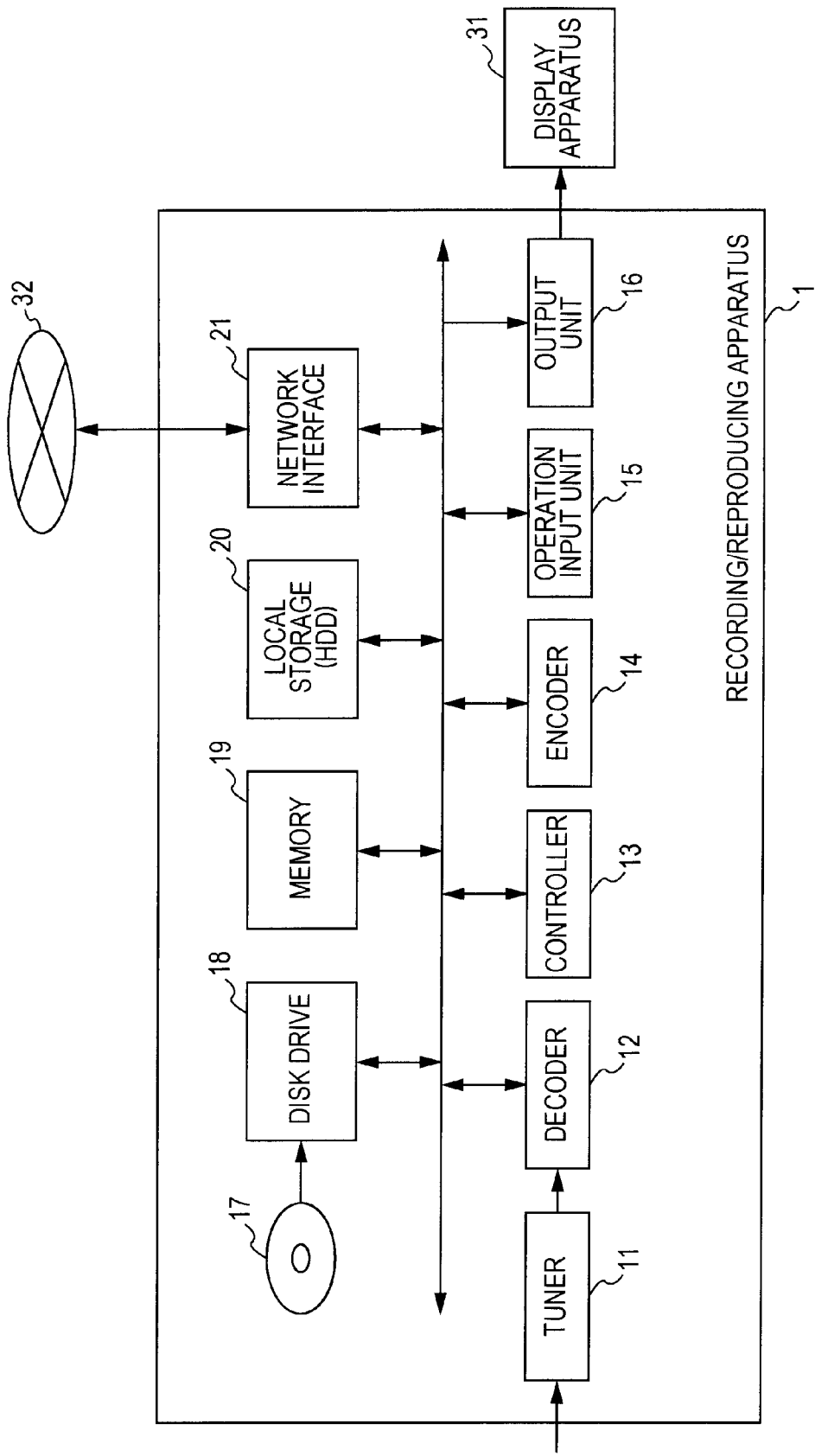
FIG. 1 is a block diagram illustrating an example of the configuration of a recording/reproducing apparatus according to an embodiment of the present invention.

Example of Configuration of Recording/reproducing Apparatus According to Embodiment of Present Invention FIG. 1 illustrates an example of the configuration of a recording/reproducing apparatus according to an embodiment of the present invention.

A recording/reproducing apparatus 1 is an apparatus that records or reproduces data of 2D content and 3D content. Note that, hereinafter, data of 2D content and 3D content will be referred to as 2D content data and 3D content data, respectively, and, when it is unnecessary to distinguish between them, they are simply referred to as content and content data.

A tuner 11 receives a broadcasting wave signal of a digital broadcast (a terrestrial digital broadcast, or a broadcasting satellite (BS)/communications satellite (CS) digital broadcast) via an antenna and demodulates the signal. Also, the tuner 11 obtains, from the demodulated signal, a Moving Picture Experts Group-Transport Stream (MPEG-TS), and supplies the MPEG-TS to a decoder 12.

The decoder 12 descrambles the scrambled MPEG-TS supplied from the tuner 11, and extracts a stream including data of a program to be viewed (to be recorded). The decoder 12 decodes an audio packet and a video packet constituting the extracted stream, and supplies the obtained audio data and video data to an output unit 16 and the like. Also, the decoder 12 additionally extracts electronic program guide (EPG) data or the like from the MPEG-TS, and supplies the EPG data to a controller 13.

In the decoder 12, audio data and video data obtained by decoding are audio data and video data of 2D content or 3D content.

Data of 3D content may be supplied in such a manner that data of an L image and an R image are supplied as different MPEG-TSs or as a single MPEG-TS. Alternatively, data of an L image and an R image may be supplied in a form including data of one of the L image and the R image and depth information.

Note that, when the encoding format of a broadcasting wave signal received by the tuner 11 and the encoding format of an encoder 14 described later are different, the decoder 12 can perform decoding in accordance with both encoding formats.

The controller 13 controls a recording/reproducing operation of the recording/reproducing apparatus 1 in accordance with an operation command from an operation input unit 15 using a control program recorded in a memory 19 or a local storage 20.

For example, when content data received by the tuner 11 is to be recorded, the controller 13 supplies the decoded content data from the decoder 12 to a disk drive 18 or the local storage 20.

Also, for example, when content data is to be reproduced, the controller 13 reads the content data out to the disk drive 18 to which an optical disk 17 is mounted or the local storage 20, and supplies the content data to the output unit 16.

Under control of the controller 13, the encoder 14 encodes content data supplied from the decoder 12, the optical disk 17, or the like in the MPEG format.

In order to reduce the data volume of data of 3D content and to save the data, the encoder 14 can perform encoding in H.264 Advanced Video Coding (AVC)/Multi-view Video Coding (MVC).

In H.264 AVC/MVC, an image stream called a base view video and an image stream called a dependent view video are defined. Hereinafter, H.264 AVC/MVC may also be simply referred to as "MVC".

MVC performs encoding not only using prediction between images in the time domain but also using prediction between streams (views).

That is, in MVC, a base view video is not allowed to perform predictive coding that uses another stream as a reference image, but a dependent view video is allowed to perform predictive coding that uses a base view video as a reference image. Therefore, for example, the encoder 14 performs encoding using an L image as a base view video and an R image as a dependent view video. In this case, since predictive coding of the R image is performed based on the L image, the data amount of the dependent view video stream can be made smaller than the data amount of the base view video stream. Also, the smaller the parallax between the L image and the R image, the smaller the prediction error in prediction between views. Thus, the data mount of encoded 3D content data becomes smaller.

Note that, since encoding is in H.265/AVC, prediction in the time domain is performed on a base view video. Also, prediction between views and prediction in the time domain are performed on a dependent view video. In order to decode a dependent view video, it is necessary that a corresponding base view video serving as a reference at the time of encoding be completed beforehand.

The operation input unit 15 includes an input device such as a button, a key, a touch panel, a jog dial, or a mouse, and a receiving unit that receives a signal such as an infrared ray transmitted from a certain remote commander. The operation input unit 15 detects an operation entered by a user, and supplies a signal representing the details of the detected operation as an operation command to the controller 13.

The output unit 16 includes a digital-to-audio (D/A) converter, and outputs content data supplied from the decoder 12 or the like as an analog or digital audio-visual (AV) signal to a display apparatus 31. The output unit 16 includes, as output terminals, for example, a High-Definition Multimedia Interface (HDMI) output terminal that outputs an AV signal as an HDMI signal, and an output terminal that outputs an AV signal as a component signal.

The disk drive 18 records content data supplied from the decoder 12, the local storage 20, or the like on the mounted optical disk 17. Also, the disk drive 18 reads content data recorded on the optical disk 17, and supplies the content data to the decoder 12 or the like. The optical disk 17 includes, for example, a digital versatile disc (DVD) or a Blu-ray® Disc.

The memory 19 stores data that is necessary to be temporarily stored in a recording/reproducing operation of the recording/reproducing apparatus 1.

The local storage 20 includes, for example, a hard disk drive (HDD). The local storage 20 stores a control program for performing a recording/reproducing operation, and data (including content data) obtained from the tuner 11, the optical disk 17, or the like.

Under control of the controller 13, a network interface 21 performs communication with a server (not illustrated) via a network server 32, and supplies data downloaded from the server to the local storage 20.

Based on an operation of a reproducing instruction from a user, the recording/reproducing apparatus 1 including the above elements reproduces 3D content data recorded in the local storage 20 or the like, and displays an L image and an R image obtained as a result thereof on the display apparatus 31. By viewing and recognizing the L image and the R image displayed in a time division manner using, for example, a shutter method, the user can stereoscopically perceive an image.

The recording/reproducing apparatus 1 has a function (viewing situation adaptive saving function) of reducing the data volume of 3D content data stored in the local storage 20 in accordance with a user's viewing situation.

Figure 2:
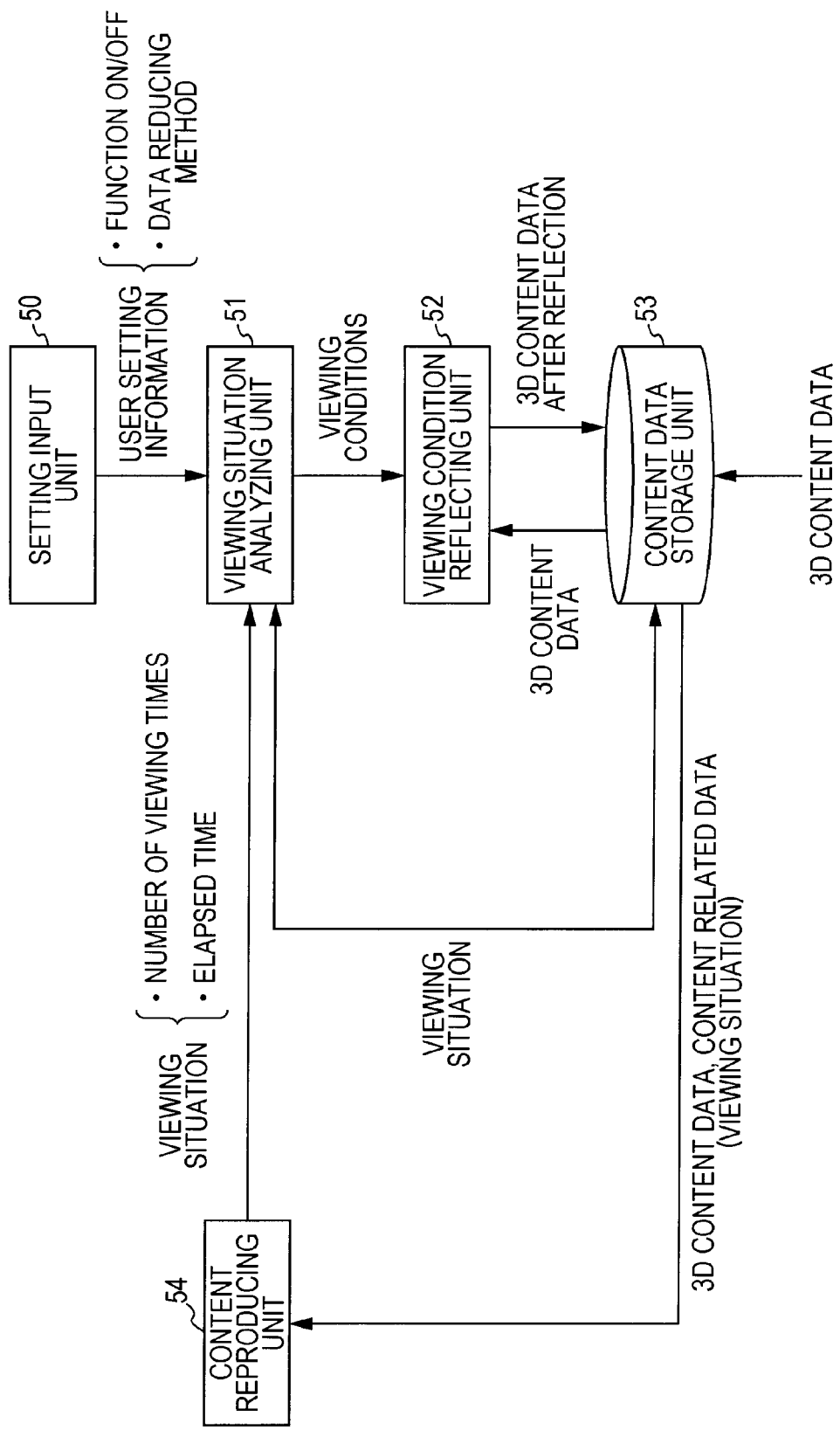
FIG. 2 is a block diagram illustrating an example of the functional configuration in the case where a viewing situation adaptive saving process is executed.

FIG. 2 is a block diagram illustrating an example of the functional configuration of the recording/reproducing apparatus 1 regarding the viewing situation adaptive saving function.

The recording/reproducing apparatus 1 includes a setting input unit 50, a viewing situation analyzing unit 51, a viewing condition reflecting unit 52, a content data storage unit 53, and a content reproducing unit 54.

For example, the setting input unit 50 corresponds to the operation input unit 15 in FIG. 1. Also, the viewing situation analyzing unit 51 corresponds to the controller 13 in FIG. 1, and the viewing condition reflecting unit 52 corresponds to the decoder 12, the controller 13, and the encoder 14 in FIG. 1. The content data storage unit 53 corresponds to the local storage 20 in FIG. 1, and the content reproducing unit 54 corresponds to the decoder 12 and the disk drive 18 in FIG. 1.

The setting input unit 50 accepts an input entered by a user. Using the setting input unit 50, the user can set ON/OFF of the viewing situation adaptive saving function. Also, the user can set a method of reducing a data volume (data reduction method) using the setting input unit 50. A data reduction method is a method of reducing data by performing bit rate conversion, a method of reducing data by performing resolution conversion, a method of reducing data by performing data format conversion, or a method of reducing data by reducing the parallax between an L image and an R image. The user selects a desired data reduction method from among these four types of data reduction methods. Note that data reduction using methods other than these methods is not to be excluded, and an arbitrary data reduction method can be set.

ON/OFF information of the viewing situation adaptive saving function and information indicating the data reduction method, which have been set by the user, are supplied as user setting information from the setting input unit 50 to the viewing situation analyzing unit 51.

Based on the user setting information, the viewing situation analyzing unit 51 performs control for reducing the data volume of 3D content data stored in the content data storage unit 53 in accordance with the user's viewing situation.

Specifically, the viewing situation analyzing unit 51 analyzes the user's viewing situation of each item of 3D content data stored in the content data storage unit 53. That is, the viewing situation analyzing unit 51 searches for 3D content of which data is to be reduced, such as 3D content whose elapsed time has exceeded a certain reference or 3D content whose number of viewing times is small, from among the individual items of 3D content stored in the content data storage unit 53. Note that, in the content data storage unit 53, as will be described later, data representing a viewing situation of 3D content is stored in association with that 3D content data. The viewing situation analyzing unit 51 determines a data reduction level of the 3D content, detected by the search, of which data is to be reduced.

Also, when 3D content is reproduced by the content reproducing unit 54, the viewing situation of the 3D content changes. Therefore, when 3D content is reproduced by the content reproducing unit 54, the viewing situation analyzing unit 51 obtains the viewing situation of the 3D content being reproduced from the content reproducing unit 54. The viewing situation analyzing unit 51 analyzes the viewing situation of the 3D content being reproduced, and determines a data reduction level of the 3D content being reproduced.

When there is a change in the determined data reduction level, that is, when it is necessary to perform data compression of the 3D content data in the content data storage unit 53, the viewing situation analyzing unit 51 supplies the determined data reduction level of the 3D content, together with the data reduction method set by the user, to the viewing condition reflecting unit 52.

Note that, in the present embodiment, it is assumed that three levels, namely, "no data reduction", "low", and "high", are prepared as data reduction levels.

Based on the data reduction level and the data reduction method supplied from the viewing situation analyzing unit 51, the viewing condition reflecting unit 52 performs data conversion (data compression) of the 3D content data stored in the content data storage unit 53.

When data conversion of the 3D content data is performed by the viewing condition reflecting unit 52, the content reproducing unit 54 reproduces the data-converted 3D content data. Therefore, it can be stated that the data reduction level and the data reduction method supplied from the viewing situation analyzing unit 51 are conditions (viewing conditions) of the 3D content data when the user views the 3D content.

Therefore, the viewing situation analyzing unit 51 supplies viewing conditions in accordance with the user's viewing situation of the 3D content to the viewing condition reflecting unit 52, and the viewing condition reflecting unit 52 reflects the viewing conditions in the 3D content data stored in the content data storage unit 53. The data-converted 3D content data is stored, in place of the 3D content data before conversion, in the content data storage unit 53.

The content data storage unit 53 stores 3D content data received by the tuner 11 or obtained by reading from the optical disk 17 or the like. Note that, when 3D content data is first stored in the content data storage unit 53, the 3D content data is stored in a format in which the bit rate is 8 Mbps, the resolution is 1920×1080p (full high-definition (HD) size), and there are two (full HD×2) images, namely, an L image and an R image.

Also, the content data storage unit 53 stores, in association with 3D content data, content related data that is data related to the 3D content data. Content related data is information representing the viewing situation of that 3D content. Specifically, the information includes the number of times the 3D content has been viewed so far, and the elapsed time since the 3D content has been saved in the content data storage unit 53. Content related data is generated by the viewing situation analyzing unit 51 and is associated with 3D content data.

The content reproducing unit 54 obtains 3D content data to be reproduced and content related data from the content data storage unit 53, and reproduces the 3D content. Also, based on the obtained content related data, the content reproducing unit 54 supplies the viewing situation of the reproduced 3D content to the viewing situation analyzing unit 51.

Data Reduction Level Determining Method

Next, referring to FIG. 3, a data reduction level determining method performed by the viewing situation analyzing unit 51 will be described.

In accordance with the viewing situation of 3D content, that is, the number of viewing times and the elapsed time, the viewing situation analyzing unit 51 determines a data reduction level of the 3D content data. As has been described above, data reduction levels are classified into three levels, namely, "no data reduction", "low", and "high".

As illustrated in FIG. 3, the viewing situation analyzing unit 51 selects "no data reduction level" as a data reduction level for 3D content whose number of viewing times is great and elapsed time is short.

In contrast, the viewing situation analyzing unit 51 selects "low" as a data reduction level for 3D content whose number of viewing times is great and elapsed time is long, and for 3D content whose number of viewing times is small and elapsed time is short.

Also, the viewing situation analyzing unit 51 sets "high" as a data reduction level for 3D content whose number of viewing times is small and elapsed time is long.

As above, the viewing situation analyzing unit 51 determines a data reduction level based on a saving reference in accordance with the user's viewing situation, and supplies the data reduction level, together with the data reduction method set by the user, as viewing conditions to the viewing condition reflecting unit 52.

Note that how many times is enough to say that the number of viewing times is "small" or "great", or how long is enough to say that the elapsed time is "short" or "long" can be set by the user using the setting input unit 50. Further, the user may also set which data reduction levels are to be associated with four patterns of combinations of the number of viewing times and the elapsed time in the table in FIG. 3.

Example of Detailed Configuration of Viewing Condition Reflecting Unit 52

Figure 4:
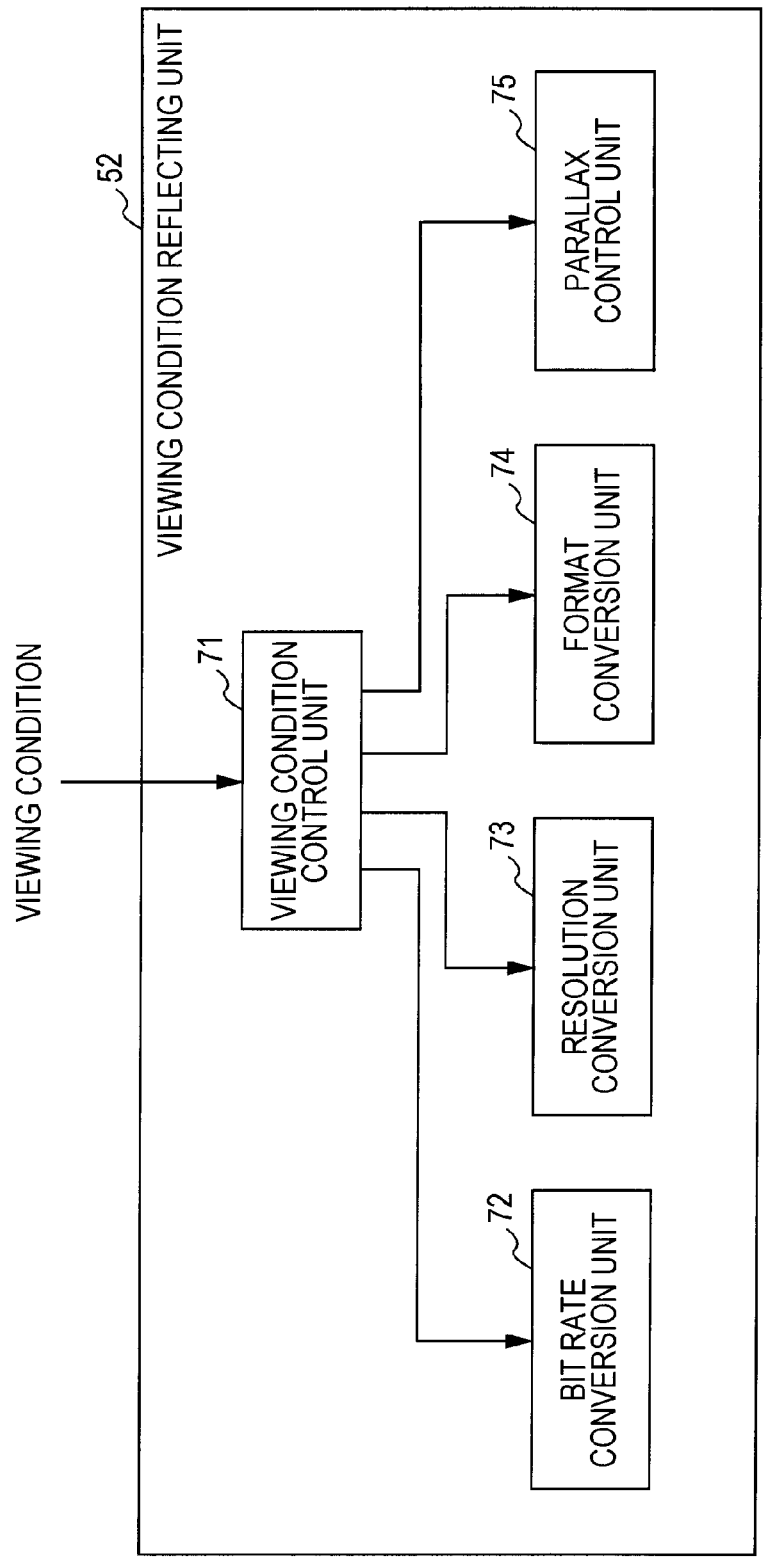
FIG. 4 is a block diagram illustrating an example of the detailed configuration of a viewing condition reflecting unit.

FIG. 4 is a block diagram illustrating an example of the detailed configuration of the viewing condition reflecting unit 52.

The viewing condition reflecting unit 52 includes a viewing condition control unit 71, a bit rate conversion unit 72, a resolution conversion unit 73, a format conversion unit 74, and a parallax control unit 75.

Based on a viewing condition supplied from the viewing situation analyzing unit 51, the viewing condition control unit 71 performs control so that one of the bit rate conversion unit 72, the resolution conversion unit 73, the format conversion unit 74, and the parallax control unit 75 will operate.

That is, when a data reduction method supplied as a viewing condition is bit rate conversion, the viewing condition control unit 71 causes the bit rate conversion unit 72 to obtain 3D content data from the content data storage unit 53 and to convert the data. In contrast, when a data reduction method supplied as a viewing condition is resolution conversion, the viewing condition control unit 71 causes the resolution conversion unit 73 to convert the data. Alternatively, when a data reduction method supplied as a viewing condition is format conversion, the viewing condition control unit 71 causes the format conversion unit 74 to convert the data. When the data reduction method is parallax control, the viewing condition control unit 71 causes the parallax control unit 75 to convert the data.

The bit rate conversion unit 72 performs bit rate conversion of 3D content data in accordance with a data reduction level supplied from the viewing condition control unit 71. Specifically, when "low" level bit rate conversion is designated by the viewing condition control unit 71, the bit rate conversion unit 72 converts 3D content data with a bit rate of 8 Mbps to that with a bit rate of 5 Mbps. Alternatively, when "high" level bit rate conversion is designated by the viewing condition control unit 71, the bit rate conversion unit 72 converts the bit rate of 3D content data to 3 Mbps.

The resolution conversion unit 73 performs resolution conversion of 3D content data in accordance with a data reduction level supplied from the viewing condition control unit 71. Specifically, when "low" level resolution conversion is designated by the viewing condition control unit 71, the resolution conversion unit 73 performs resolution conversion of 3D content data with a resolution of 1920×1080p to that with a resolution of 1280×720p. Alternatively, when "high" level resolution conversion is designated by the viewing condition control unit 71, the resolution conversion unit 73 converts the resolution of 3D content data to 720×480p.

The format conversion unit 74 performs format conversion of 3D content data in accordance with a data reduction level supplied from the viewing condition control unit 71.

Figure 5:
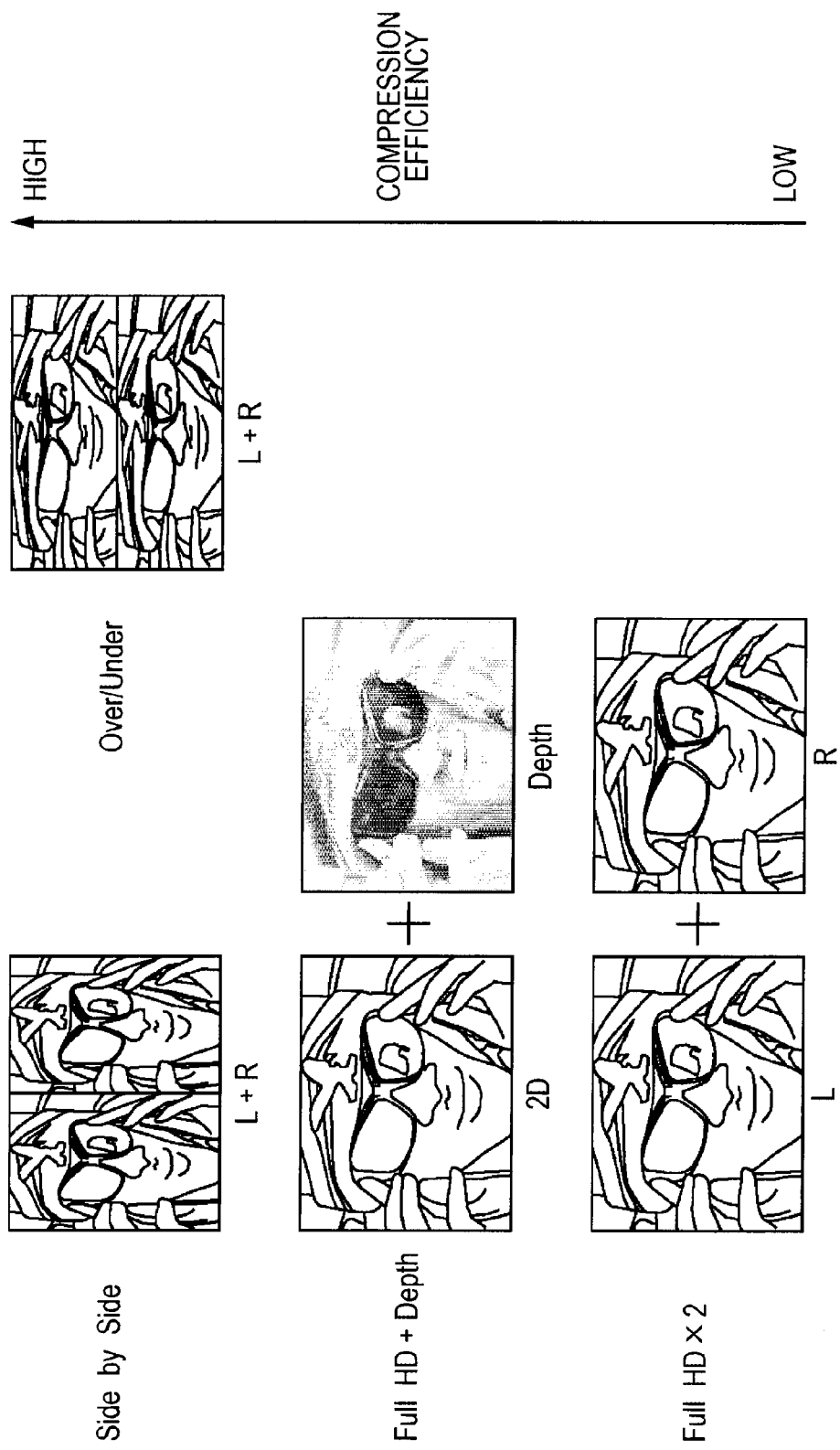
FIG. 5 is a diagram illustrating the relationship between each format of 3D content data and a data volume.

FIG. 5 illustrates the relationship between each format of 3D content data and a data volume.

Note that an L image and an R image in FIG. 5 are actually color images, though they are represented using lines. Also, depth information is conceptually represented as gradation information in FIG. 5.

As illustrated in FIG. 5, formats of 3D content data include a first format that holds both the L image and the R image, a second format that includes one of the L image and the R image and depth information, and a third format that combines two images, namely, the L image and the R image, as an image with the same size as a single L image (R image). Here, it is assumed that the size of the L image and the R image in the first and second formats and the combined image in the third format is full HD size. In this case, the data volume to be saved decreases in the order of the first format, the second format, and the third format, as illustrated in FIG. 5.

When "low" level format conversion is designated by the viewing condition control unit 71, the format conversion unit 74 converts the format from the first format including two images, namely, the L image and the R image, with a full HD size to the second format including one full-HD-size image and depth information.

In contrast, when "high" level format conversion is designated by the viewing condition control unit 71, the format conversion unit 74 performs format conversion of the format of 3D content data to the third format including a single image with a full HD size. Note that, as illustrated in FIG. 5, in the case of a single image with a full HD size, whether to combine the L image and the R image in a format where the L image and the R image are horizontally arranged (side by side) or to combine the L image and the R image in a format where the L image and the R image are vertically arranged (over/under) can be arbitrarily determined.

Referring back to FIG. 4, the parallax control unit 75 performs parallax control of 3D content data in accordance with a data reduction level supplied from the viewing condition control unit 71. Specifically, when "low" level parallax control is designated by the viewing condition control unit 71, the parallax control unit 75 changes the parallax to be small with a certain ratio with respect to a parallax set to the original L image and R image. Alternatively, when "high" level parallax control is designated by the viewing condition control unit 71, the parallax control unit 75 changes the parallax to zero. That is, the parallax control unit 75 holds only one of the original L image and R image, and deletes the other.

Data conversion in accordance with a data reduction level supplied from the viewing condition control unit 71, which is performed by the bit rate conversion unit 72, the resolution conversion unit 73, the format conversion unit 74, or the parallax control unit 75, is summarized as illustrated in FIG. 6.

Note that, although one of the four types of data reduction methods illustrated in FIG. 6 can be selected in the present embodiment, data reduction methods are not limited to the four types, and at least one type is necessary. Also, plural types may be selected and executed at the same time from among the four types of data reduction methods.

Since data conversion is executed by one of the bit rate conversion unit 72, the resolution conversion unit 73, the format conversion unit 74, and the parallax control unit 75, the data volume of 3D content data stored in the content data storage unit 53 is reduced.

Note that the bit rate conversion unit 72, the resolution conversion unit 73, the format conversion unit 74, and the parallax control unit 75 perform decoding or encoding using MVC, if necessary, before/after data conversion.

Example of Detailed Configuration of Parallax Control Unit 75

Figure 7:
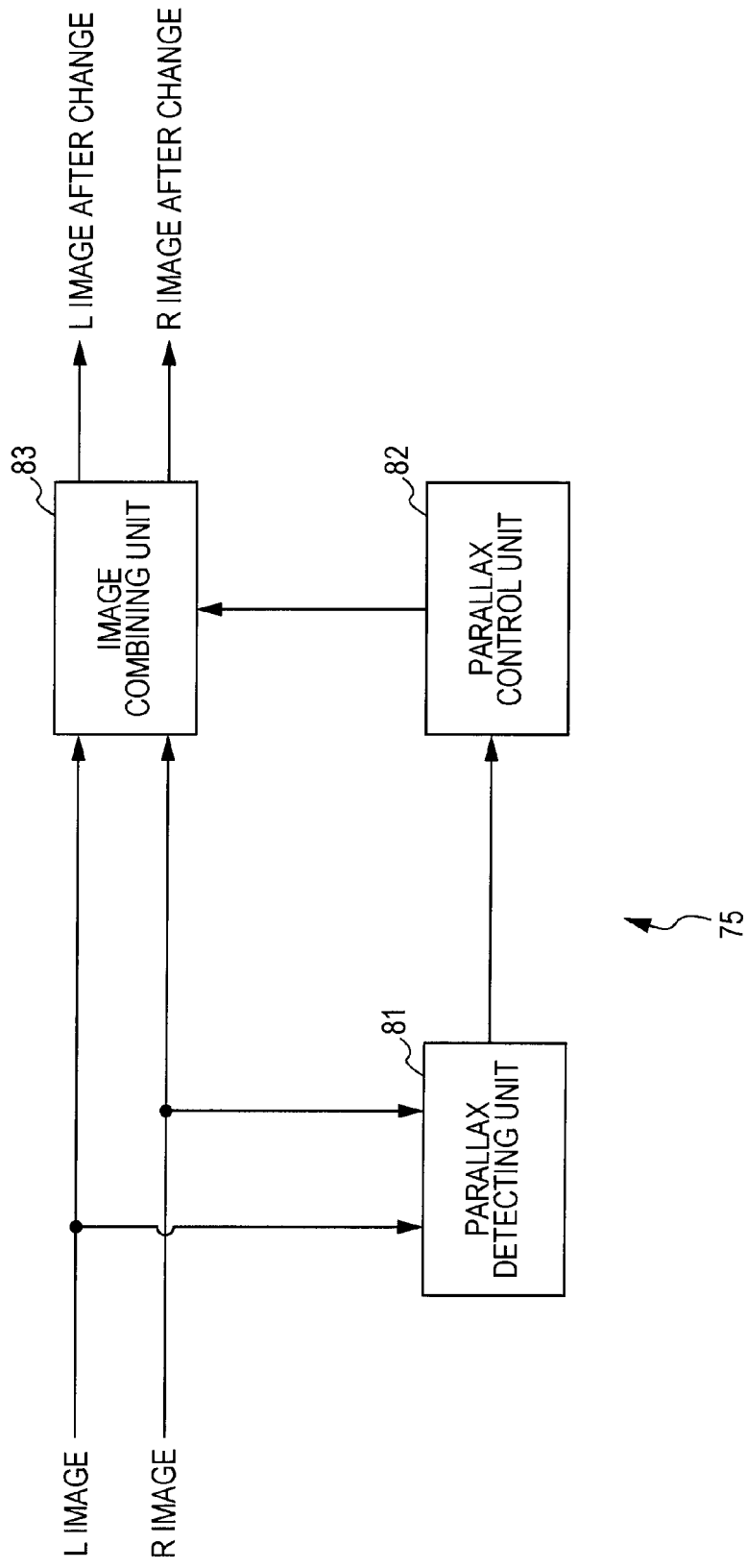
FIG. 7 is a block diagram illustrating an example of the detailed configuration of a parallax control unit.

FIG. 7 is a block diagram illustrating an example of the detailed configuration of the parallax control unit 75 which performs control to reduce the parallax between an L image and an R image.

The parallax control unit 75 includes a parallax detecting unit 81, a parallax control unit 82, and an image combining unit 83.

An L image and an R image supplied to the parallax control unit 75 are input to the parallax detecting unit 81 and the image combining unit 83. The parallax detecting unit 81 detects the parallax between the L image and the R image and supplies the parallax to the parallax control unit 82.

Based on the parallax detected by the parallax detecting unit 81, the parallax control unit 82 determines how the parallax is to be changed, and supplies the determined parallax to the image combining unit 83. The image combining unit 83 generates, from the input L image and R image, an L image and an R image after the parallax is changed so that the parallax will be the determined parallax, and outputs the generated L image and R image.

Viewing Situation Adaptive Saving Process Performed on Reproduced Content

Next, with reference to the flowchart in FIG. 8, a viewing situation adaptive saving process performed on 3D content reproduced by the content reproducing unit 54 will be described.

At first, in step S1, the content reproducing unit 54 obtains 3D content data of 3D content designated by a user to be reproduced (hereinafter referred to as "content to be reproduced" or "reproduced content") and its content related data.

In step S2, the content reproducing unit 54 starts reproducing the content to be reproduced.

In step S3, the content reproducing unit 54 determines whether reproducing of the content to be reproduced is completed, and enters standby until it is determined that reproducing is completed.

When it is determined in step S3 that reproducing is completed, the process proceeds to step S4, and the content reproducing unit 54 supplies the content related data to the viewing situation analyzing unit 51.

In step S5, the viewing situation analyzing unit 51 analyzes the viewing situation of the reproduced content supplied from the content reproducing unit 54, and, based on user setting information, determines viewing conditions of the reproduced content. That is, based on the viewing situation of the reproduced content, the viewing situation analyzing unit 51 determines whether to reduce data of the reproduced content, and, when data is to be reduced, determines which data reduction method and which data reduction level to use.

In step S6, the viewing situation analyzing unit 51 determines, as a result of the analysis, whether the viewing conditions of the reproduced content are changed. When it is determined in step S6 that the viewing conditions of the reproduced content are not changed, the viewing situation adaptive saving process ends.

In contrast, when it is determined in step S6 that the viewing conditions of the reproduced content are changed, the process proceeds to step S7, and the viewing situation analyzing unit 51 causes the viewing condition reflecting unit 52 to reflect the viewing conditions. That is, the viewing situation analyzing unit 51 supplies the viewing conditions of the reproduced content to the viewing condition reflecting unit 52. The viewing condition reflecting unit 52 performs data compression of the 3D content data of the reproduced content, which is stored in the content data storage unit 53, using the set data reduction method and data reduction level, and ends the process.

Figure 8:
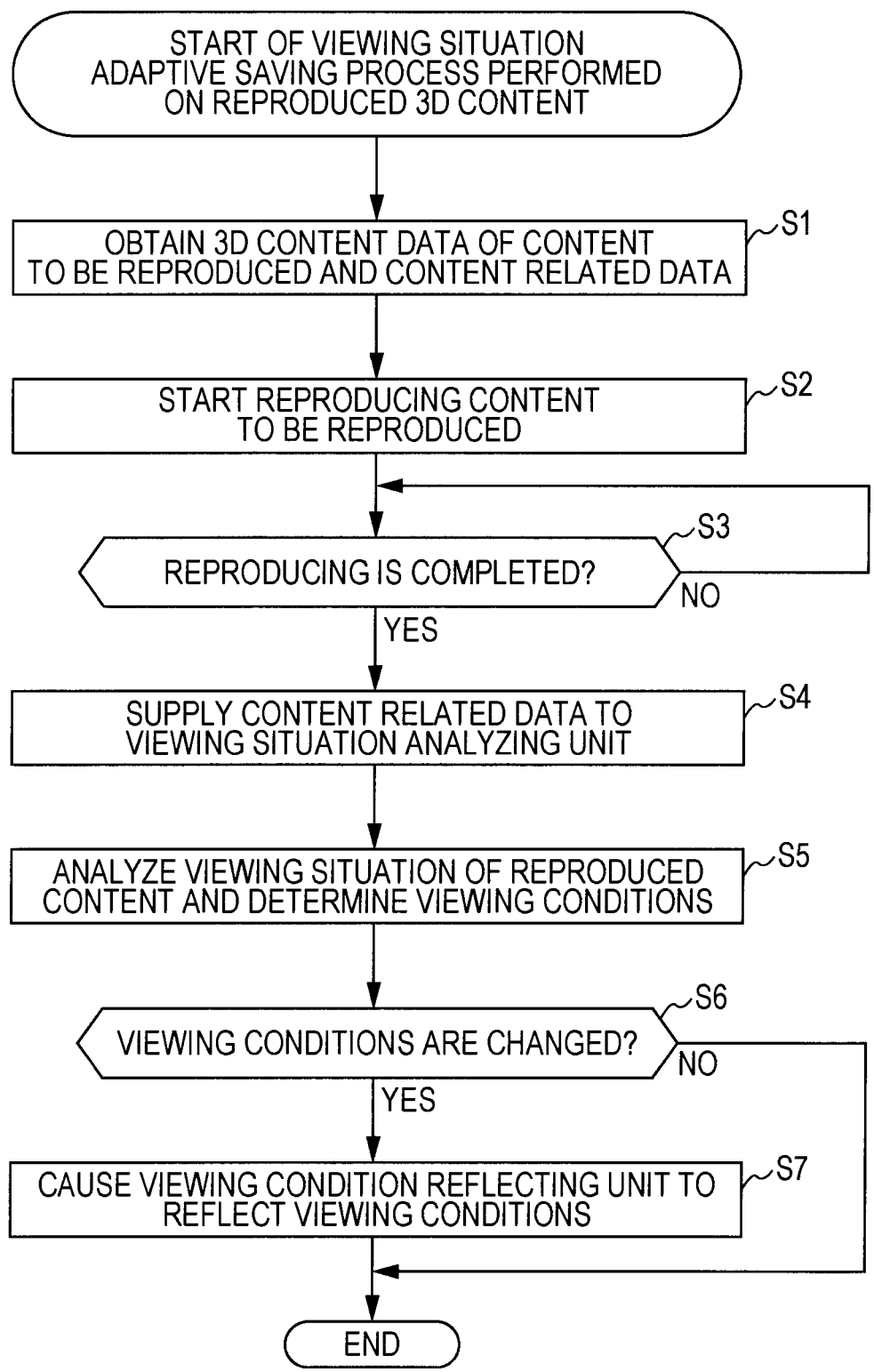
FIG. 8 is a flowchart describing a viewing situation adaptive saving process performed on 3D content.

With the process in FIG. 8, when 3D content is reproduced, the viewing situation of the reproduced 3D content is checked, and, in accordance with the viewing situation, the 3D content data in the content data storage unit 53 is compressed.

Viewing Situation Adaptive Saving Process Performed on 3D Content in Content Data Storage Unit Next, a viewing situation adaptive saving process performed on 3D content stored in the content data storage unit 53 will be described.

Figure 9:
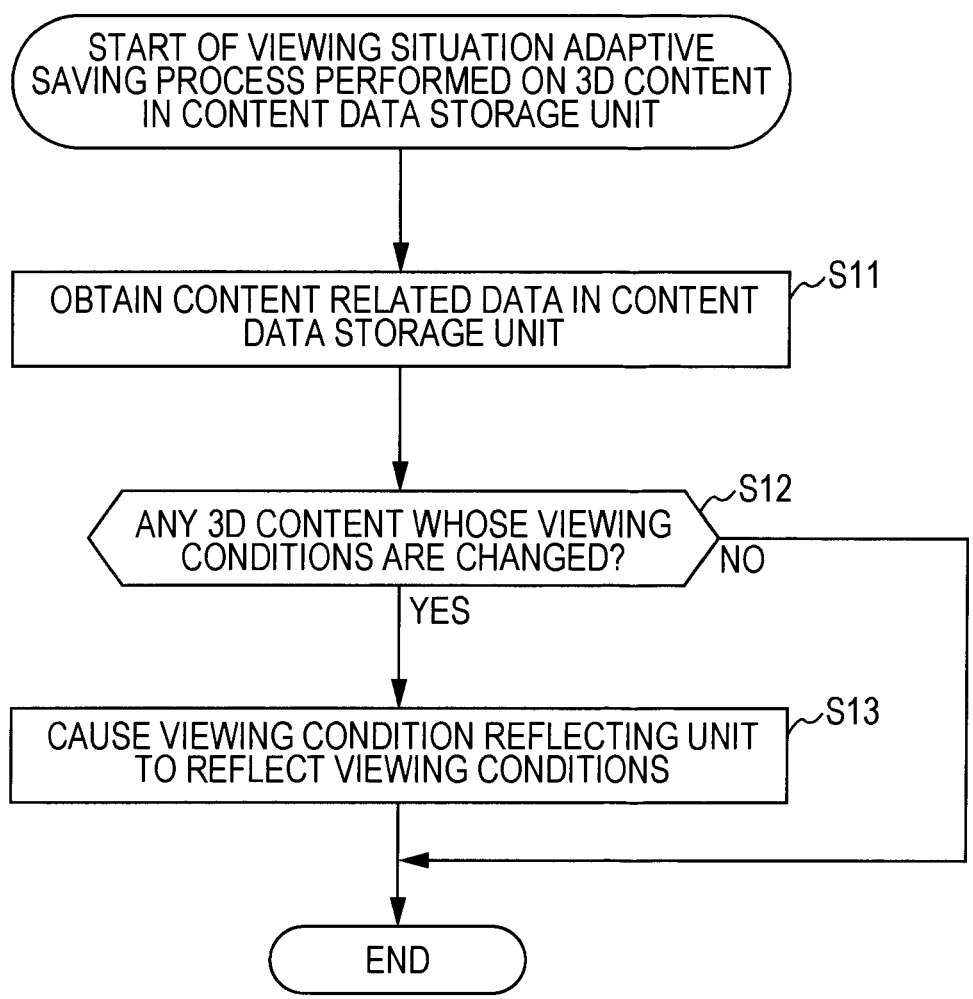
FIG. 9 is a flowchart describing a viewing situation adaptive saving process performed on 3D content stored in a content data storage unit.

FIG. 9 is a flowchart of a viewing situation adaptive saving process performed on 3D content stored in the content data storage unit 53.

At first, in step S11, the viewing situation analyzing unit 51 obtains content related data of 3D content stored in the content data storage unit 53.

In step S12, the viewing situation analyzing unit 51 determines, based on user setting information, whether there is 3D content whose content viewing conditions are changed.

When it is determined in step S12 that there is no 3D content whose viewing conditions are changed, the viewing situation adaptive saving process ends.

In contrast, when it is determined in step S12 that there is 3D content whose viewing conditions are changed, the viewing situation analyzing unit 51 causes the viewing condition reflecting unit 52 to reflect the viewing conditions of that 3D content, and ends the viewing situation adaptive saving process.

With the process in FIG. 9, the viewing situation of 3D content stored in the content data storage unit 53 is checked, and, in accordance with the viewing situation, the 3D content data in the content data storage unit 53 is compressed.

As above, with the viewing situation adaptive saving function of the recording/reproducing apparatus 1, 3D content data in the content data storage unit 53 is organized in accordance with a user's viewing situation. That is, data of 3D content whose number of times it has been viewed by a user is small or 3D content whose elapsed time is long is subjected to data compression using a viewing situation adaptive saving process. Accordingly, the data volume of 3D content saved in the content data storage unit 53 can be reduced. Since 3D content has a greater amount of data than 2D content, such a data volume reducing function is effective.

Modification of Present Embodiment

The embodiment of the present invention is not limited to the above-described embodiment, and various changes can be made without departing from the gist of an embodiment of the present invention.

For example, although the number of viewing times and the elapsed time have been adopted as the viewing situation of 3D content, as has been described with reference to FIG. 3, only one of the number of viewing times and the elapsed time may be adopted.

Also, normalized data can be employed for the number of viewing times and the elapsed time. Specifically, it is assumed that the number of viewing times of 3D content whose number of viewing times is the greatest is 1, and the numbers of viewing times of all items of 3D content can be set. Also, it is assumed that the elapsed time of 3D content whose elapsed time is the longest is 1, and the elapsed times of all items of 3D content can be set.

Alternatively, data other than the number of viewing times and the elapsed time can be adopted as the viewing situation of 3D content. For example, instead of the number of viewing times, a value obtained by dividing the viewing time of 3D content by the recording time (broadcast time of a program) of the 3D content (viewing time/recording time) can be adopted.

Instead of setting the viewing situation in units of items of 3D content, the viewing situation can be set in units of genres of 3D content. For example, for 3D content whose genre is "movies", the proportion of "movie" content to all items of 3D content stored in the content data storage unit 53 can serve as the viewing situation of each item of "movie" content. Accordingly, 3D content stored in the content data storage unit 53 can be organized in units of genres.

In the above-described embodiment, an example where a storage medium that saves 3D content to be organized exists within the recording/reproducing apparatus 1 has been described. However, a storage medium that saves 3D content to be organized may be provided outside the apparatus. In this case, a control unit that controls 3D content saved in the storage medium exchanges the viewing situation of content by performing communication, and controls data compression of 3D content data using a certain data reduction method.

A storage medium where 3D content to be organized is saved may be a magnetic disk, an optical disk, a magneto-optical disk, or a semiconductor memory other than an HDD.

Further, in the above-described embodiment, an example where the recording/reproducing apparatus 1 executes a viewing situation adaptive saving process has been described. However, an embodiment of the present invention is applicable to an apparatus that is different from the recording/producing apparatus and that has a content saving function, such as a television receiver, a mobile terminal, or an image capturing apparatus.

Other Embodiments

In the above-described embodiment, 3D content data is subjected to data compression in accordance with a user's viewing situation, and, when the 3D content data is designated to be reproduced, the data-compressed 3D content data is employed as it is for reproduction.

Therefore, although the data volume in the content data storage unit 53 can be reduced, when data is to be reduced, the image quality of an image displayed on the display apparatus 31 becomes worse than that when 3D content data obtained for the first time by the recording/reproducing apparatus 1 is reproduced.

Thus, when 3D content data to be reproduced is data-compressed, the recording/reproducing apparatus 1 can apply an image quality improvement process to the data-compressed 3D content data, and reproduce the processed 3D content data.

For example, a class classification adaptation process can be adopted as an image quality improvement process of data-compressed 3D content data.

Figure 10:
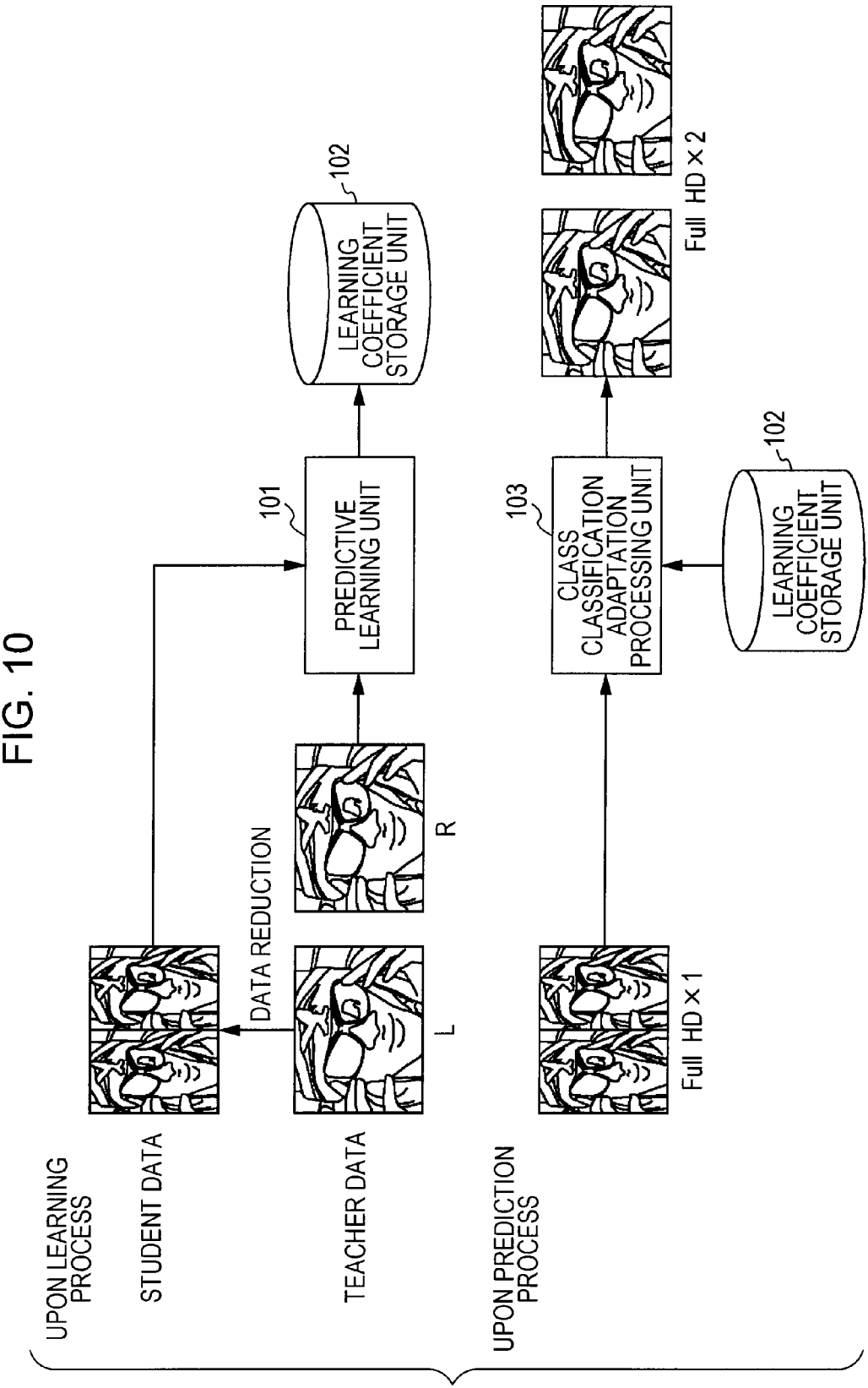
FIG. 10 is a conceptual diagram in the case where a class classification adaptation process is adopted as an image quality improvement process.

FIG. 10 illustrates a conceptual diagram in the case where a class classification adaptation process is adopted as an image quality improvement process of data-compressed 3D content data.

In a class classification adaptation process, a learning coefficient for generating an output image based on an input image is obtained in advance by learning using teacher data that serves as a teacher in learning and student data that serves as a student in learning. Using the learning coefficient obtained by learning, a process of converting the input image is executed.

When an image quality improvement process of data-compressed 3D content data is performed using a class classification adaptation process, 3D content data before data compression serves as teacher data, and 3D content data after data compression serves as student data. For example, as illustrated in FIG. 10, 3D content data in the first format including two full-HD-size images, namely, an L image and an R image, serves as teacher data, and 3D content data that has been format-converted to the third format including a single full-HD-size image serves as student data. A learning coefficient is obtained by a predictive learning unit 101, and is stored in a learning coefficient storage unit 102.

At the time at which an image quality improvement process is executed, using the learning coefficient stored in the learning coefficient storage unit 102, a class classification adaptation processing unit 103 executes an image conversion process of converting an input image to an image-quality-improved image, and outputs the converted image.

For example, the class classification adaptation processing unit 103 converts 3D content data of a single full-HD size image, which is stored in the content data storage unit 53, to 3D content data including two full-HD-size images, namely, an L image and an R image, by using the learning coefficient stored in the learning coefficient storage unit 102. Accordingly, 3D content data whose image quality has been improved to be similar to the image quality before data reduction can be reproduced.

Referring to FIGS. 11 to 15, the predictive learning unit 101 which obtains a learning coefficient and the class classification adaptation processing unit 103 which performs an image quality improvement process using the learning coefficient obtained by learning will be described in detail.

Example of detailed configuration of class classification adaptation processing unit 103

Figure 11:
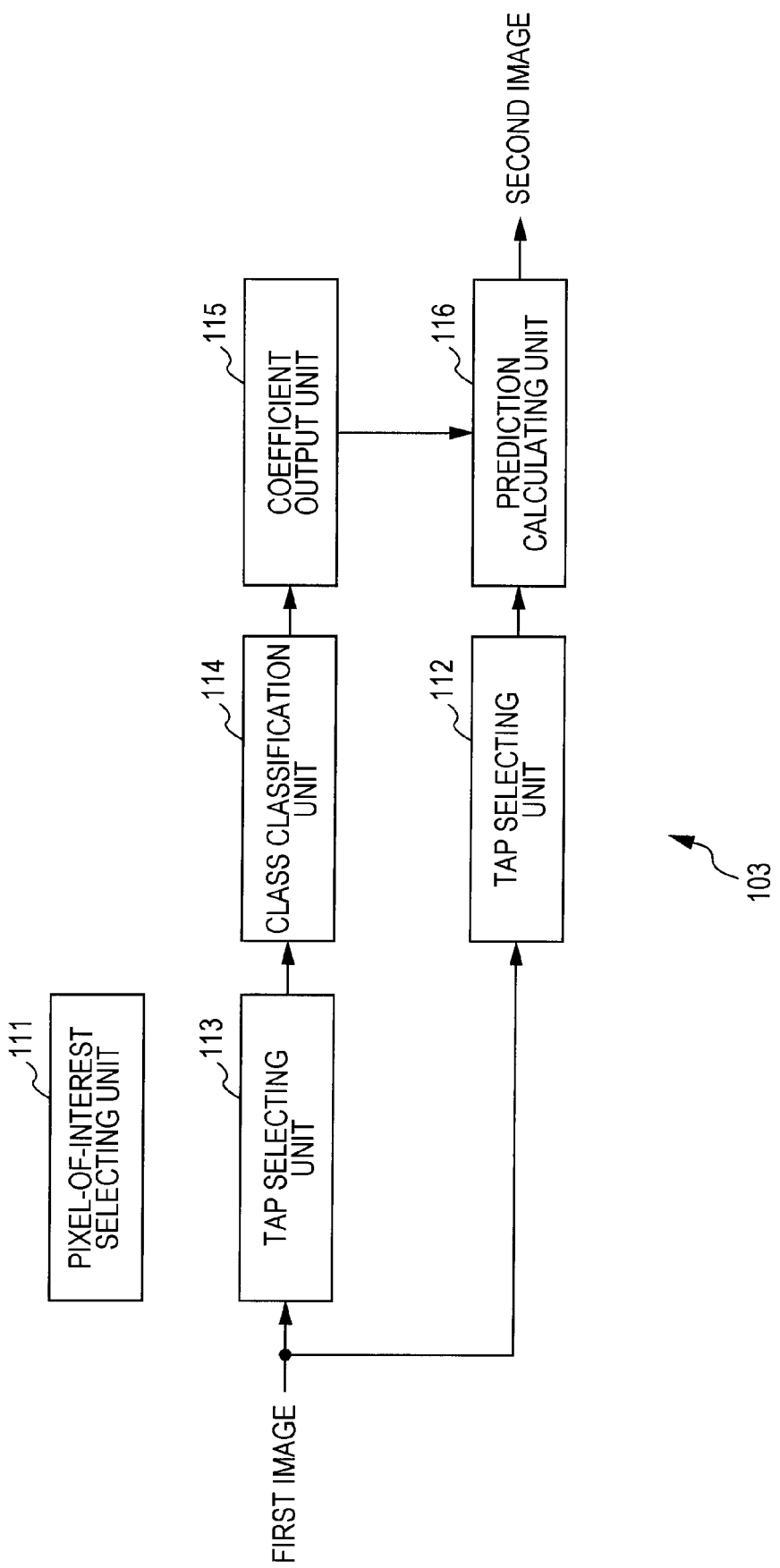
FIG. 11 is a block diagram illustrating an example of the configuration of a class classification adaptation processing unit in FIG. 10.

FIG. 11 illustrates an example of the configuration of the class classification adaptation processing unit 103.

Data-compressed 3D content data is input as first image data to the class classification adaptation processing unit 103, and 3D content data whose image quality has been improved to be similar to the image quality before data reduction is output as a second image from the class classification adaptation processing unit 103.

In the class classification adaptation processing unit 103, (the pixel value of) a pixel of interest to which attention is paid in the second image data is obtained by a calculation using a learning coefficient of a class obtained by class-classifying (the pixel value of) the pixel of interest into one of a plurality of classes, and (the pixel value of) a pixel in the first image data selected for the pixel of interest.

Data-compressed 3D content data serving as first image data is supplied to tap selecting units 112 and 113.

A pixel-of-interest selecting unit 111 regards each of the pixels constituting second image data as a pixel of interest, and supplies information representing that pixel of interest to a necessary block.

The tap selecting unit 112 selects, as prediction taps, some of (the pixel values of) pixels constituting the first image data used in predicting (the pixel value of) the pixel of interest.

Specifically, the tap selecting unit 112 selects, as prediction taps, a plurality of pixels of the first image data at positions spatially or temporally close to the temporal/spatial position of the pixel of interest.

The tap selecting unit 113 selects, as class taps, some of the pixels constituting the first image data used in class-classifying the pixel of interest into any of the classes. That is, the tap selecting unit 113 selects class taps in a manner similar to that in which the tap selecting unit 112 selects prediction taps.

Note that the prediction taps and the class taps may have the same tap structure or different tap structures.

The prediction taps obtained by the tap selecting unit 112 are supplied to the a prediction calculating unit 116, and the class taps obtained by the tap selecting unit 113 are supplied to a class classification unit 114.

Based on the class taps from the tap selecting unit 113, the class classification unit 114 class-classifies the pixel of interest, and supplies a class code corresponding to the class obtained as a result thereof to a coefficient output unit 115.

Here, as a method of performing class classification, for example, adaptive dynamic range coding (ADRC) or the like can be adopted.

In a method using ADRC, (the pixel values of) pixels constituting the class taps are subjected to ADRC processing, and, in accordance with an ADRC code obtained as a result thereof, the class of the pixel of interest is determined.

Note that, in K-bit ADRC, for example, the maximum value MAX and the minimum value MIN of the pixel values of pixels constituting the class taps are detected, and DR=MAX−MIN serves as a local dynamic range of the set. Based on this dynamic range DR, the pixel value of each of the pixels constituting the class taps is re-quantized to K bits. That is, the minimum value MIN is subtracted from the pixel value of each of the pixels constituting the class taps, and the value obtained by this subtraction is divided (re-quantized) by $DR/2^K$. A bit string obtained by arranging the pixel values of the individual K-bit pixels constituting the class taps, which are obtained as above, in a certain order is output as an ADRC code. Therefore, when the class taps are subjected to, for example, 1-bit ADRC processing, the pixel value of each of the pixels constituting the class taps is divided by the average of the maximum value MAX and the minimum value MIN (truncated after the decimal point). Accordingly, the pixel value of each pixel becomes one bit (binarized). A bit string obtained by arranging the 1-bit pixel values in a certain order is output as an ADRC code.

Note that the class classification unit 114 may output, for example, a level distribution pattern of the pixel values of pixels constituting the class taps as it is as a class code. However, in this case, if the class taps are constituted of the pixel values of N pixels and if K bits are allocated to the pixel value of each pixel, the number of class codes output by the class classification unit 114 is $(2^N)^K$, which is a vast number that is exponentially proportional to the number of bits K of the pixel value of each pixel.

Therefore, it is preferable that the class classification unit 114 perform class classification by compressing the information volume of the class taps by performing the above-described ADRC processing, vector quantization, or the like.

The coefficient output unit 115 stores a learning coefficient for each class obtained by learning described later, and further outputs, among the stored learning coefficients, a learning coefficient stored at an address corresponding to a class code supplied from the class classification unit 114 (learning coefficient of a class represented by a class code supplied from the class classification unit 114). This learning coefficient is supplied to the prediction calculating unit 116.

The prediction calculating unit 116 obtains the prediction taps output by the tap selecting unit 112 and the learning coefficient output by the coefficient output unit 115, and, using the prediction taps and the learning coefficient, performs a certain prediction calculation for obtaining a predicted value of the true value of the pixel of interest. Accordingly, the prediction calculating unit 116 obtains and outputs (the predicted value of) the pixel value of the pixel of interest, that is, the pixel value of the pixel included in the second image data.

Figure 12:
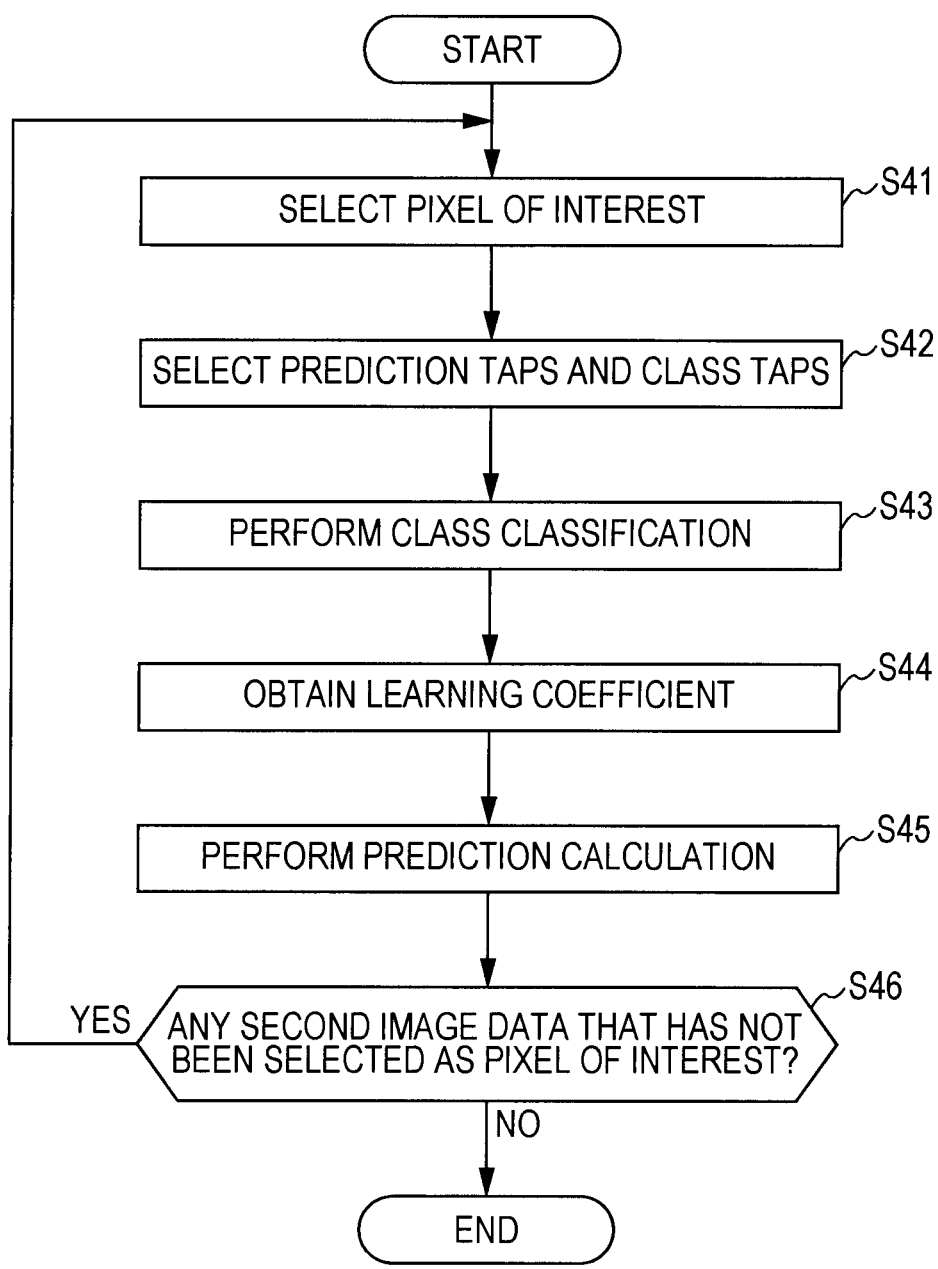
FIG. 12 is a flowchart describing an image quality improvement process performed by the class classification adaptation processing unit in FIG. 11.

Next, with reference to the flowchart in FIG. 12, an image quality improvement process performed by the class classification adaptation processing unit 103 in FIG. 11 will be described.

In step S41, the pixel-of-interest selecting unit 111 selects, from among the pixels constituting the second image data for the first image data input to the class classification adaptation processing unit 103, one of those that have not been selected as pixels of interest as a pixel of interest. For example, from among the pixels constituting the second image data, those that have not been selected as pixels of interest are sequentially selected in a raster scan order as pixels of interest.

In step S42, the tap selecting unit 112 and the tap selecting unit 113 respectively select, from the first image data supplied thereto, those that serve as prediction taps and class taps for the pixel of interest. The prediction taps are supplied from the tap selecting unit 112 to the prediction calculating unit 116, and the class taps are supplied from the tap selecting unit 113 to the class classification unit 114.

The class classification unit 114 receives the class taps for the pixel of interest from the tap selecting unit 113. In step S43, based on the class taps, the class classification unit 114 class-classifies the pixel of interest. Further, the class classification unit 114 outputs a class code representing the class of the pixel of interest, which is obtained as a result of the class classification, to the coefficient output unit 115.

In step S44, the coefficient output unit 115 obtains and outputs a learning coefficient stored at an address corresponding to the class code supplied from the class classification unit 114. Further, in step S44, the class classification unit 114 obtains a learning coefficient output by the coefficient output unit 115.

In step S45, the prediction calculating unit 116 performs a certain prediction calculation using the prediction taps output by the tap selecting unit 112 and the learning coefficient obtained from the coefficient output unit 115. Accordingly, the prediction calculating unit 116 obtains and outputs the pixel value of the pixel of interest.

In step S46, the pixel-of-interest selecting unit 111 determines whether there is any second image data that has not been selected as a pixel of interest. When it is determined in step S46 that there is second image data that has not been selected as a pixel of interest, the process returns to step S41, and thereafter, a similar process is repeated.

Alternatively, when it is determined in step S46 that there is no second image data that has not been selected as a pixel of interest, the process ends.

Next, a prediction calculation performed by the prediction calculating unit 116 in FIG. 11 and learning of a learning coefficient stored in the coefficient output unit 115 will be described.

It will now be considered that prediction taps are selected from pixels (low image quality pixels) of the first image data, and, using the prediction taps and the learning coefficient, the pixel values of pixels (high image quality pixels) of the second image data are obtained (predicted) by a certain prediction calculation.

When, for example, a linear prediction calculation is adopted as the certain prediction calculation, the pixel value y of a high image quality pixel is obtained by the following linear expression:

$$y = \sum_{n=1}^{N} w_n x_n \quad (1)$$

Note that, in equation (1), $x_n$ represents the pixel value of an n-th pixel of low image quality image data (hereinafter appropriately referred to as a "low image quality pixel") constituting prediction taps for the high image quality pixel y, and $w_n$ represents an n-th learning coefficient multiplied with (the pixel value of) the n-th low image quality pixel. Note that, in equation (1), it is assumed hat the prediction taps include N low image quality pixels $x_1, x_2, \ldots, x_N$.

Here, the pixel value y of the high image quality pixel may be obtained not using the linear expression indicated in equation (1), but using a quadratic or higher expression.

When it is assumed that the true value of the pixel value of a k-th sample high image quality pixel is represented as $y_k$ and a predicted value of the true value $y_k$ obtained by equation (1) is represented as $y_k'$, its prediction error $e_k$ is represented by the following equation:

$$e_k = y_k - y_k' \quad (2)$$

Since the predicted value $y_k'$ in equation (2) is obtained in accordance with equation (1), if $y_k'$ in equation (2) is replaced in accordance with equation (1), the following equation is obtained:

$$e_k = y_k - \left( \sum_{n=1}^{N} w_n x_{n,k} \right) \quad (3)$$

Note that, in equation (3), $x_{n,k}$ represents an n-th low image quality pixel included in the prediction taps for the k-th sample high image quality pixel.

A learning coefficient $w_n$ that makes the prediction error $e_k$ in equation (3) (or equation (2)) 0 is optimal for predicting the high image quality pixel. However, it is generally difficult to obtain such learning coefficients $w_n$ for all high image quality pixels.

Thus, when, for example, the least-squares method is adopted as a norm for representing that the learning coefficient $w_n$ is optimal, the optimal learning coefficient $w_n$ can be obtained by minimizing the sum total E of squared errors represented by the following equation:

$$E = \sum_{k=1}^{K} e_k^2 \quad (4)$$

Note that, in equation (4), K represents the number of samples (the number of samples for learning) of sets of a high image quality pixel $y_k$ and low image quality pixels $x_{1,k}$, $x_{2,k}, \ldots, x_{N,k}$ constituting prediction taps for the high image quality pixel $y_k$.

The minimum value (minimal value) of the sum total E of the squared errors in equation (4) is given by $w_n$ that obtains 0 when the sum total E is partially differentiated by the learning coefficient $w_n$:

$$\frac{\partial E}{\partial w_n} = e_1 \frac{\partial e_1}{\partial w_n} + e_2 \frac{\partial e_2}{\partial w_n} + \ldots + e_k \frac{\partial e_k}{\partial w_n} = 0 \quad (5)$$

$$(n = 1, 2, \ldots, N)$$

When equation (3) described above is partially differentiated by the learning coefficient $w_n$, the following equations are obtained:

$$\frac{\partial e_k}{\partial w_1} = -x_{1,k}, \frac{\partial e_k}{\partial w_2} = -x_{2,k}, \ldots, \frac{\partial e_k}{\partial w_N} = -x_{N,k}, \quad (6)$$

$$(k = 1, 2, \ldots, K)$$

From equations (5) and (6), the following equations are derived:

$$\sum_{k=1}^{K} e_k x_{1,k} = 0, \sum_{k=1}^{K} e_k x_{2,k} = 0, \ldots \sum_{k=1}^{K} e_k x_{N,k} = 0 \quad (7)$$

By substituting equation (3) for $e_k$ in equations (7), equations (7) can be represented by a normal equation indicated in equation (8):

$$\begin{bmatrix} \left(\sum_{k=1}^{K} x_{1,k} x_{1,k}\right) & \left(\sum_{k=1}^{K} x_{1,k} x_{2,k}\right) & \cdots & \left(\sum_{k=1}^{K} x_{1,k} x_{N,k}\right) \\ \left(\sum_{k=1}^{K} x_{2,k} x_{1,k}\right) & \left(\sum_{k=1}^{K} x_{2,k} x_{2,k}\right) & \cdots & \left(\sum_{k=1}^{K} x_{2,k} x_{N,k}\right) \\ \vdots & \vdots & \ddots & \vdots \\ \left(\sum_{k=1}^{K} x_{N,k} x_{1,k}\right) & \left(\sum_{k=1}^{K} x_{N,k} x_{2,k}\right) & \cdots & \left(\sum_{k=1}^{K} x_{N,k} x_{N,k}\right) \end{bmatrix} \begin{bmatrix} w_1 \\ w_2 \\ \vdots \\ w_N \end{bmatrix} = \begin{bmatrix} \left(\sum_{k=1}^{K} x_{1,k} y_k\right) \\ \left(\sum_{k=1}^{K} x_{2,k} y_k\right) \\ \vdots \\ \left(\sum_{k=1}^{K} x_{N,k} y_k\right) \end{bmatrix} \quad (8)$$

The normal equation in equation (8) can be solved for the learning coefficient $w_n$ by using, for example, a sweeping out method (Gauss-Jordan elimination) or the like.

By setting up and solving the normal equation in equation (8) for each class, the optimal learning coefficient (learning coefficient that minimizes the sum total E of the squared errors) $w_n$ can be obtained for each class.

Figure 13:
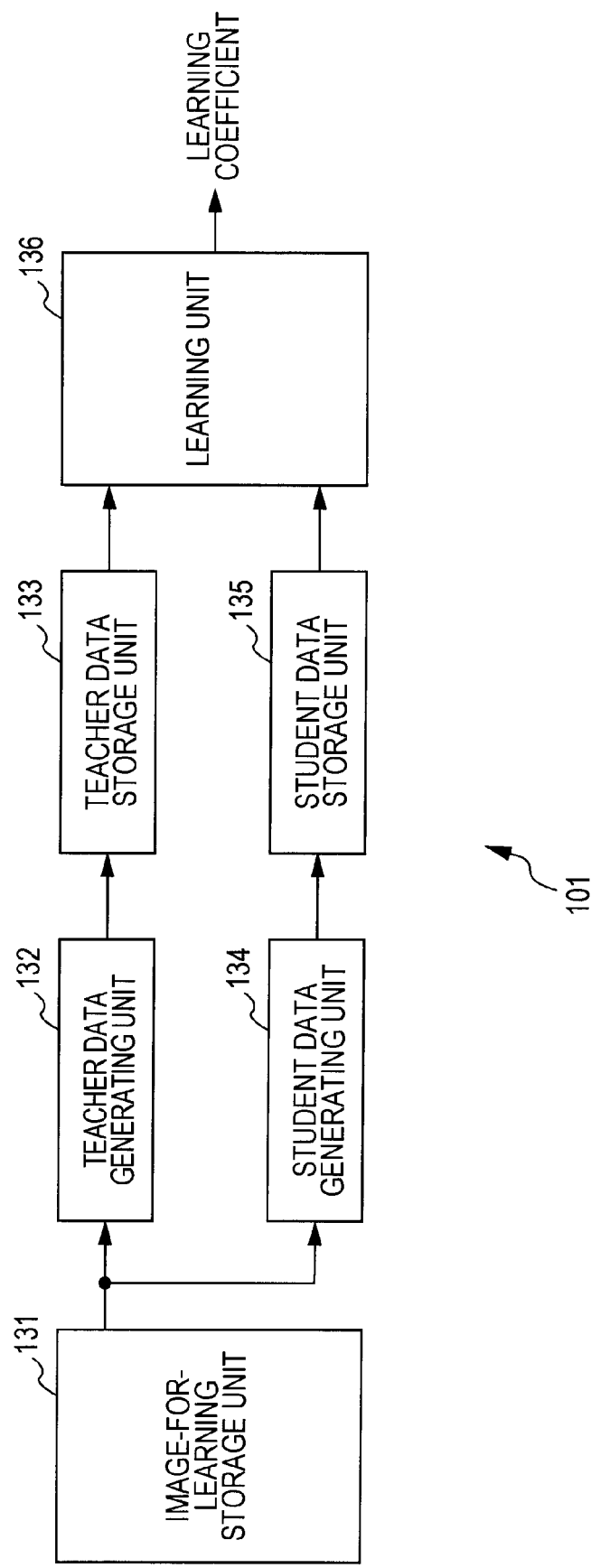
FIG. 13 is a block diagram illustrating an example of the configuration of a predictive learning unit in FIG. 10.

FIG. 13 illustrates an example of the configuration of the predictive learning unit 101 which performs learning for obtaining the learning coefficient $w_n$ by setting up and solving the normal equation in equation (8).

An image-for-learning storage unit 131 stores image data for learning, which is used in learning of the learning coefficient $w_n$. Here, for example, 3D content data in the first format can be used as the image data for learning.

A teacher data generating unit 132 reads the image data for learning from the image-for-learning storage unit 131. Further, the teacher data generating unit 132 generates, from the image data for learning, teacher data that becomes a teacher (true value) in learning the learning coefficient, that is, the pixel value of a mapping destination of mapping serving as the prediction calculation using equation (1), and supplies the teacher data to a teacher data storage unit 133. Here, the teacher data generating unit 132 supplies, for example, the 3D content data serving as the image data for learning as it is as teacher data to the teacher data storage unit 133.

The teacher data storage unit 133 stores the 3D content data serving as the teacher data supplied from the teacher data generating unit 132.

A student data generating unit 134 reads the image data for learning from the image-for-learning storage unit 131. Further, the student data generating unit 134 generates, from the image data for learning, student data that becomes a student in learning the learning coefficient, that is, the pixel value to be converted by mapping serving as the prediction calculation using equation (1), and supplies the student data to a student data storage unit 135. Here, the student data generating unit 134 converts the format of the 3D content data in the first format serving as the image data for learning to generate 3D content data in the third format, and supplies the 3D content data in the third format as student data to the student data storage unit 135.

The student data storage unit 135 stores the student data supplied from the student data generating unit 134.

A learning unit 136 regards each of the pixels constituting the 3D content data in the first format, which serves as the teacher data stored in the teacher data storage unit 133, as a pixel of interest, and, for that pixel of interest, selects, as prediction taps, low image quality pixels having the same tap structure as those selected by the tap selecting unit 112 in FIG. 11 from among low image quality pixels constituting the 3D content data in the third format, which serves as the student data stored in the student data storage unit 135. Further, using each of the pixels constituting the teacher data and the prediction taps selected when that pixel is selected as the pixel of interest, the learning unit 136 sets up and solves the normal equation in equation (8) for each class, thereby obtaining a learning coefficient for each class.

Figure 14:
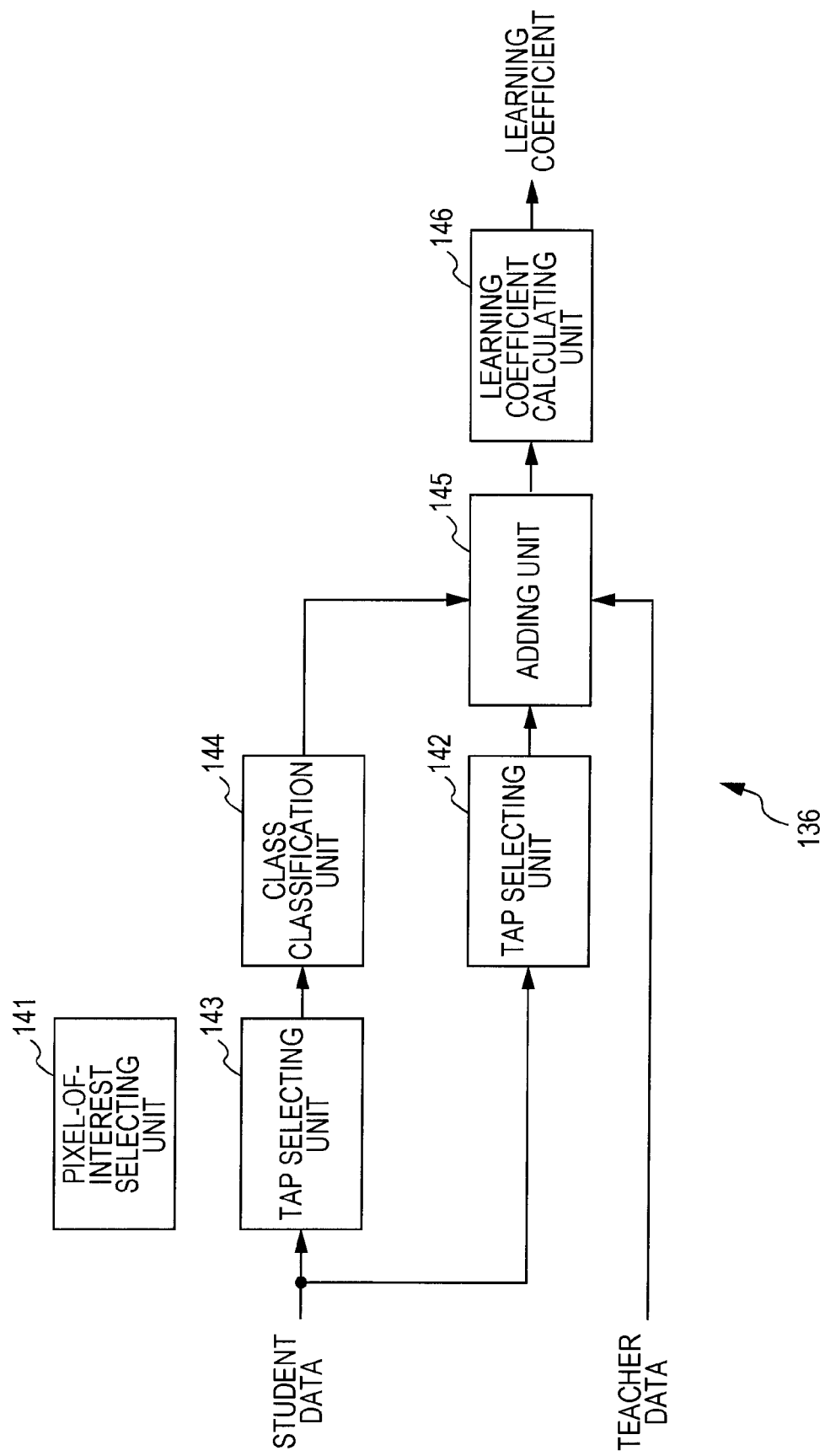
FIG. 14 is a block diagram illustrating an example of the configuration of a learning unit in FIG. 13.

That is, FIG. 14 illustrates an example of the configuration of the learning unit 136 in FIG. 13.

A pixel-of-interest selecting unit 141 selects each of the pixels constituting the teacher data stored in the teacher data storage unit 133 as a pixel of interest, and supplies information representing that pixel of interest to a necessary block.

A tap selecting unit 142 selects, for the pixel of interest, the same pixels as those selected by the tap selecting unit 112 in FIG. 11 from among low image quality pixels constituting low image quality image data serving as the student data stored in the student data storage unit 135. Accordingly, the tap selecting unit 142 obtains prediction taps having the same tap structure as that obtained by the tap selecting unit 112, and supplies the prediction taps to an adding unit 145.

A tap selecting unit 143 selects, for the pixel of interest, the same pixels as those selected by the tap selecting unit 113 in FIG. 11 from among the low image quality pixels constituting the low image quality image data serving as the student data stored in the student data storage unit 135. Accordingly, the tap selecting unit 143 obtains class taps having the same tap structure as that obtained by the tap selecting unit 113, and supplies the class taps to a class classification unit 144.

Based on the class taps output by the tap selecting unit 143, the class classification unit 144 performs the same class classification as that performed by the class classification unit 114 in FIG. 11, and outputs a class code corresponding to the class obtained as a result thereof to the adding unit 145.

The adding unit 145 reads the teacher data (pixel) serving as the pixel of interest from the teacher data storage unit 133, and performs addition of the pixel of interest and student data (pixels) constituting the prediction taps for the pixel of interest, which are supplied from the tap selecting unit 142, for each class code supplied from the class classification unit 144.

That is, teacher data $y_k$ stored in the teacher data storage unit 133, prediction taps $x_{n,k}$ output by the tap selecting unit 142, and the class code output by the class classification unit 144 are supplied to the adding unit 145.

For each class corresponding to the class code supplied from the class classification unit 144, the adding unit 145 performs a calculation corresponding to multiplication ($x_{n,k} x_{n',k}$) between items of student data in a matrix on the left side of equation (8) and summation ($\Sigma$) by using the prediction taps (student data) $x_{n,k}$.

Further, for each class corresponding to the class code supplied from the class classification unit 144, the adding unit 145 performs a calculation corresponding to multiplication ($x_{n,k} y_k$) between the prediction taps (student data) $x_{n,k}$ and the teacher data $y_k$ in a vector on the right side of equation (8) and summation ($\Sigma$) by using the prediction taps (student data) $x_{n,k}$ and the teacher data $y_k$.

That is, the adding unit 145 stores components ($\Sigma x_{n,k} x_{n',k}$) of the matrix on the left side of equation (8) obtained, for the previous time, for the teacher data serving as the pixel of interest and components ($\Sigma x_{n,k} y_k$) of the vector on the right side in a built-in memory (not illustrated). For the components ($\Sigma x_{n,k} x_{n',k}$) of the matrix or the components ($\Sigma x_{n,k} y_k$) of the vector, the adding unit 145 adds, for teacher data newly serving as a pixel of interest, corresponding components $x_{n,k+1} x_{n',k+1}$ or $x_{n,k+1} y_{k+1}$ which are calculated using the teacher data $y_{k+1}$ and the student data $x_{n,k+1}$ (performs addition represented by summation in equation (8)).

By performing the above-described addition using all the items of teacher data stored in the teacher data storage unit 133 (FIG. 13) as pixels of interest, the adding unit 145 sets the normal equation indicated in equation (8) for each class, and supplies the normal equation to a learning coefficient calculating unit 146.

By solving the learning coefficient for each class, which is supplied from the adding unit 145, the learning coefficient calculating unit 146 obtains and outputs the optimal learning coefficient $w_n$ for each class.

The learning coefficient $w_n$ for each class, which is obtained as above, is stored in the coefficient output unit 115 in the class classification adaptation processing unit 103 in FIG. 11. That is, the coefficient output unit 115 in the class classification adaptation processing unit 103 in FIG. 13 corresponds to the learning coefficient storage unit 102 in FIG. 10.

Figure 15:
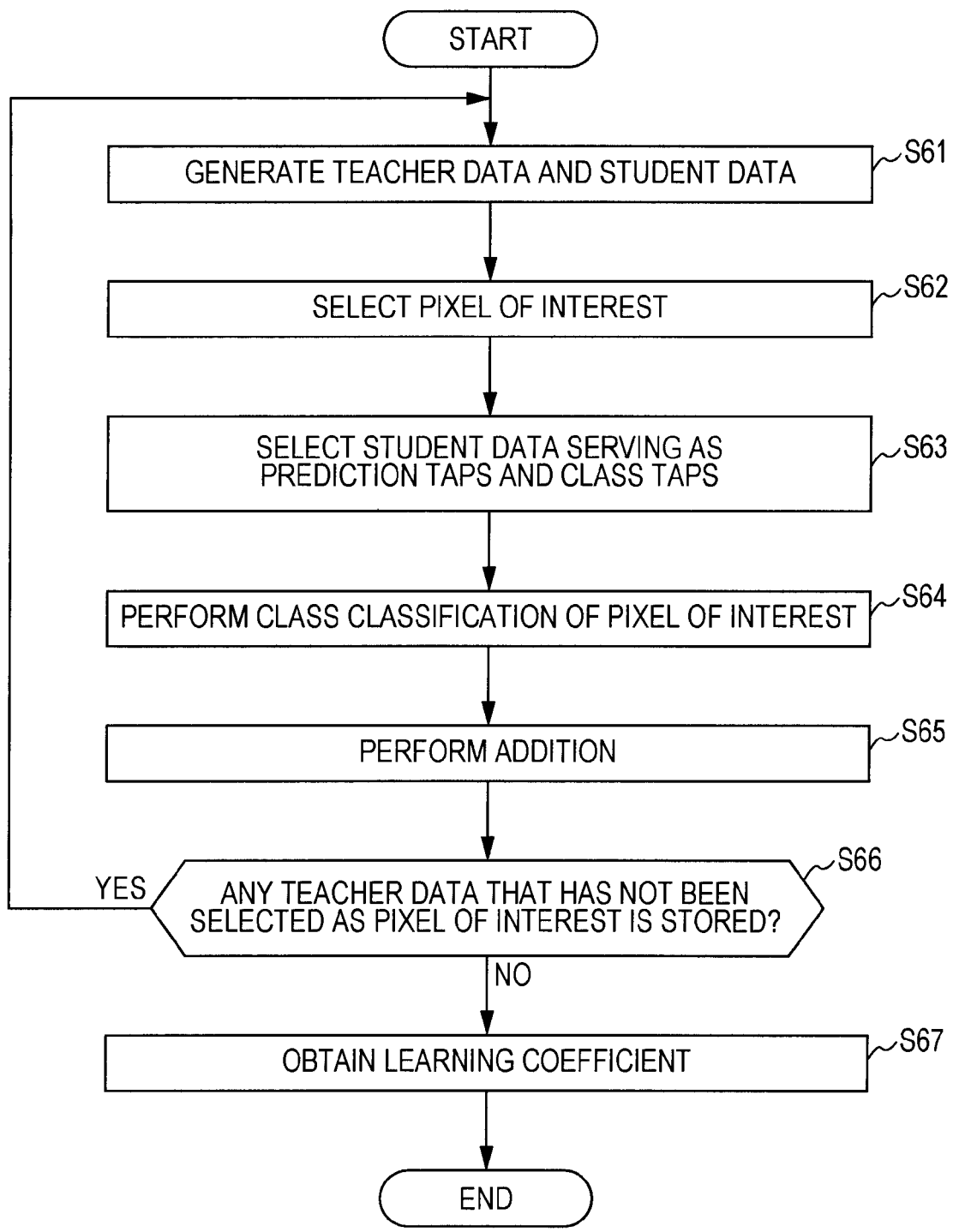
FIG. 15 is a flowchart describing a learning process performed by the predictive learning unit in FIG. 13.

Next, with reference to the flowchart in FIG. 15, a process (learning process) performed by the predictive learning unit 101 in FIG. 13 will be described.

At first, in step S61, the teacher data generating unit 132 and the student data generating unit 134 generate teacher data and student data from image data for learning that is stored in the image-for-learning storage unit 131, and supplies the teacher data and the student data to the teacher data storage unit 133 and the student data generating unit 134, respectively, so as to be stored therein.

Note that what types of teacher data and student data are to be generated by the teacher data generating unit 132 and the student data generating unit 134 differs in accordance with which 3D content data before data conversion is to be obtained by improving the image quality of data-converted 3D content data.

Thereafter, the process proceeds to step S62, and, in the learning unit 136 (FIG. 14), the pixel-of-interest selecting unit 141 selects, from among items of the teacher data stored in the teacher data storage unit 133, one of those that have not been selected as pixels of interest as a pixel of interest.

In step S63, the tap selecting unit 142 selects, for the pixel of interest, pixels serving as student data that serves as prediction taps from the student data stored in the student data storage unit 135, and supplies the pixels to the adding unit 145. Also, in step S63, the tap selecting unit 143 selects, for the pixel of interest, student data serving as class taps from the student data stored in the student data storage unit 135, and supplies the student data to the class classification unit 144.

In step S64, based on the class taps for the pixel of interest, the class classification unit 144 class-classifies the pixel of interest, and outputs a class code corresponding to the class obtained as a result thereof to the adding unit 145.

In step S65, the adding unit 145 reads the pixel of interest from the teacher data storage unit 133. The adding unit 145 performs addition in equation (8) of the pixel of interest and the student data constituting the prediction taps selected for the pixel of interest, which are supplied from the tap selecting unit 142, for each class code supplied from the class classification unit 144.

In step S66, the pixel-of-interest selecting unit 141 determines whether there is any teacher data that has not been selected as a pixel of interest is stored in the teacher data storage unit 133. When it is determined in step S66 that teacher data that has not been selected as a pixel of interest is still stored in the teacher data storage unit 133, the process returns to step S62, and thereafter, a similar process is repeated.

Alternatively, when it is determined in step S66 that no teacher data that has not been selected as a pixel of interest is stored in the teacher data storage unit 133, the process proceeds to step S67, and the adding unit 145 supplies the matrix on the left side and the vector on the right side of equation (8) for each class, which are obtained by processing in steps S62 to S66 so far, to the learning coefficient calculating unit 146.

Further, in step S67, the learning coefficient calculating unit 146 solves the normal equation for each class, which includes the matrix on the left side and the vector on the right side of equation (8) for each class, which are supplied from the adding unit 145, thereby obtaining and outputting the learning coefficient $w_n$ for each class, and ends the process.

Note that, owing to the fact that, for example, the number of items of image data for learning is not sufficient, there may be a class where a sufficient number of normal equations for obtaining a learning coefficient are not obtained. For such a class, the learning coefficient calculating unit 146 outputs, for example, a default learning coefficient.

As above, the recording/reproducing apparatus 1 performs an image quality improvement process adopting a class classification adaptation process for data-compressed 3D content data. Accordingly, the recording/reproducing apparatus 1 can improve the image quality of the data-compressed 3D content data, and then reproduce the 3D content data.

For 3D content data that has been data-compressed by performing bit rate conversion, in a learning process, teacher data may be 3D content data with a bit rate of 8 Mbps, and student data may be 3D content data with a bit rate of 5 Mbps or 3 Mbps.

Also, for 3D content data that has been data-compressed by performing resolution conversion, in a learning process, teacher data may be 3D content data with a resolution of 1920×1080p, and student data may be 3D content data with a resolution of 1280×720p or 1280×720p.

Further, for 3D content data that has been data-compressed by performing parallax control, in a learning process, teacher data may be 3D content data in which parallax has not been changed, and student data may be 3D content data in which parallax has been reduced (including zero parallax).

Note that the image quality improvement process using the above-described class classification adaptation process may be performed by a new block that executes the process, or may be performed by the viewing condition reflecting unit 52 or the content reproducing unit 54.

Alternatively, a process other than the class classification adaptation process may be adopted as the image quality improvement process. For example, a noise reduction process may be executed as an image quality improvement process of 3D content data that has been data-compressed by performing bit rate conversion. In this case, a noise reduction process with a higher noise reduction effect is applied to 3D content data with a bit rate of 3 Mbps than to 3D content data with a bit rate of 5 Mbps.

The above-described series of processes may be executed by hardware or may be executed by software. When the series of processes is to be executed by software, a program constituting the software is installed in a computer. The computer includes a computer incorporated in dedicated hardware or, for example, a general personal computer that can execute various functions using various programs installed therein.

FIG. 16 is a block diagram illustrating an example of the configuration of hardware of a computer that executes the above-described series of processes using the program.

In the computer, a central processing unit (CPU) 201, a read-only memory (ROM) 202, and a random access memory (RAM) 203 are connected to one another by a bus 204.

An input/output interface 205 is further connected to the bus 204. An input unit 206, an output unit 207, a storage unit 208, a communication unit 209, and a drive 210 are connected to the input/output interface 205.

The input unit 206 includes a keyboard, a mouse, a microphone, and the like. The output unit 207 includes a display, a loudspeaker, and the like. The storage unit 208 includes a hard disk, a non-volatile memory, and the like. The communication unit 209 includes a network interface or the like. The drive 210 drives a removable recording medium 211 such as a magnetic disk, an optical disk, a magneto-optical disk, or a semiconductor memory.

In the computer including the above elements, the CPU 201 loads a program stored in, for example, the storage unit 208 to the RAM 203 via the input/output interface 205 and the bus 204 and executes the program, thereby performing the above-described series of processes.

The program executed by the computer (CPU 201) can be provided as being recorded on the removable recording medium 211 serving as, for example, a packaged medium. Alternatively, the program can be provided through a wired or wireless transmission medium, such as a local area network, the Internet, or digital satellite broadcasting.

In the computer, the program can be installed in the storage unit 208 via the input/output interface 205 by mounting the removable recording medium 211 on the drive 210. Alternatively, the program can be received at the communication unit 209 via a wired or wireless transmission medium, and can be installed in the storage unit 208. Alternatively, the program can be installed in advance in the ROM 202 or the storage unit 208.

Note that the program executed by the computer may be a program with which processes are time sequentially performed in accordance with an order described in the present specification, or a program with which processes are performed in parallel or at necessary times, such as when called.

The present application contains subject matter related to that disclosed in Japanese Priority Patent Application JP 2010-013132 filed in the Japan Patent Office on Jan. 25, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
    viewing situation analyzing means for obtaining information representing a users viewing situation of 3D content stored in certain storage means, and, based on a preset saving reference in accordance with a viewing situation of 3D content, determining a data reduction level of content data of the 3D content stored in the storage means; and
    data conversion means for performing data compression of the content data of the 3D content stored in the storage means in accordance with the determined data reduction level,
    wherein the information representing the viewing situation includes the number of viewing times of the 3D content, and
    wherein the viewing situation analyzing means determines the data reduction level of the content data of the 3D content in accordance with the number of viewing times.

2. The image processing apparatus according to claim 1, wherein the information representing the viewing situation further includes an elapsed time since the 3D content has been saved in the storage means, and
    wherein the viewing situation analyzing mean further determines the data reduction level of the content data of the 3D content stored in the storage means in accordance with the elapsed time.

3. The image processing apparatus according to claim 1, wherein the viewing situation analyzing means determines, in addition to the data reduction level, a data reduction method, and
    wherein the data conversion means performs data compression of the content data of the 3D content stored in the storage means in accordance with the determined data reduction level and the determined data reduction method.

4. The image processing apparatus according to claim 3, wherein the data reduction method is one of a bit rate conversion, a resolution conversion, a format conversion, or a parallax control.

5. The image processing apparatus according to claim 1, further comprising reproducing means for reproducing the 3D content stored in the storage means,
    wherein the viewing situation analyzing means obtains information representing the user's viewing situation of the 3D content reproduced by the reproducing means, and, based on the saving reference, determines the data reduction level of the content data of the 3D content reproduced by the reproducing means.

6. The image processing apparatus according to claim 5, wherein, when the data conversion means performs data compression of the content data of the 3D content stored in the storage means, the storage means stores the data-compressed content data of the 3D content, and
    wherein the image processing apparatus further comprises image quality improvement means for applying an image quality improvement process to the data-compressed content data of the 3D content, and
    wherein the reproducing means reproduces the content data of the 3D content that has been processed by the image quality improvement means.

7. The image processing apparatus according to claim 1, further comprising setting input means for accepting a setting of a saving reference in accordance with the viewing situation of the 3D content,
    wherein the viewing situation analyzing means determines the data reduction level of the content data of the 3D content stored in the storage means, based on the saving reference in accordance with the viewing situation of the 3D content, the saving reference being set by the user using the setting input means.

8. An image processing method in which an image processing apparatus that processes image data performs a process comprising:
    obtaining information representing a user's viewing situation of 3D content stored in certain storage means, the information representing the viewing situation including the number of viewing times of the 3D content;
    based on a preset saving reference in accordance with a viewing situation of 3D content, determining a data reduction level of content data of the 3D content in accordance with the number of viewing times; and
    performing data compression of the content data of the 3D content stored in the storage means in accordance with the determined data reduction level.

9. A non-transitory computer-readable medium storing program which, when executed by a computer, causes the computer to perform:
    obtaining information representing a user's viewing situation of 3D content stored in certain storage means, the information representing the viewing situation including the number of viewing times of the 3D content;
    based on a preset saving reference in accordance with a viewing situation of 3D content, determining a data reduction level of content data of the 3D content in accordance with the number of viewing times; and
    performing data compression of the content data of the 3D content stored in the storage means in accordance with the determined data reduction level.

10. An image processing apparatus comprising:
    a viewing situation analyzing unit configured to obtain information representing a user's viewing situation of 3D content stored in a certain storage unit, and, based on a preset saving reference in accordance with a viewing situation of 3D content, determine a data reduction level of content data of the 3D content stored in the storage unit; and a data conversion unit configured to perform data compression of the content data of the 3D content stored in the storage unit in accordance with the determined data reduction level, wherein the information representing the viewing situation includes the number of viewing times of the 3D content, and wherein the viewing situation analyzing unit determines the data reduction level of the content data of the 3D content in accordance with the number of viewing times.

* * * * *